US011601731B1

(12) United States Patent
Slotznick

(10) Patent No.: US 11,601,731 B1
(45) Date of Patent: Mar. 7, 2023

(54) COMPUTER PROGRAM PRODUCT AND METHOD FOR AUTO-FOCUSING A CAMERA ON AN IN-PERSON ATTENDEE WHO IS SPEAKING INTO A MICROPHONE AT A HYBRID MEETING THAT IS BEING STREAMED VIA A VIDEOCONFERENCING SYSTEM TO REMOTE ATTENDEES

(71) Applicant: Benjamin Slotznick, Mt. Gretna, PA (US)

(72) Inventor: Benjamin Slotznick, Mt. Gretna, PA (US)

( * ) Notice: Subject to any disclaimer, the term of this patent is extended or adjusted under 35 U.S.C. 154(b) by 0 days.

(21) Appl. No.: 17/952,802

(22) Filed: Sep. 26, 2022

Related U.S. Application Data

(60) Provisional application No. 63/400,790, filed on Aug. 25, 2022.

(51) Int. Cl.
*G10L 15/22* (2006.01)
*H04N 23/67* (2023.01)
(Continued)

(52) U.S. Cl.
CPC ........... *H04N 23/675* (2023.01); *G10L 15/22* (2013.01); *H04N 23/611* (2023.01); *H04R 1/08* (2013.01); *H04R 2420/07* (2013.01)

(58) Field of Classification Search
CPC ....... G01S 1/725; G06K 9/6218; G10L 15/22; G10L 13/00; H04L 65/403;
(Continued)

(56) References Cited

U.S. PATENT DOCUMENTS 9,942,518 B1 * 4/2018 Tangeland ........... G06K 9/6218
10,356,362 B1 * 7/2019 Rudberg ................. H04R 5/04
(Continued)

OTHER PUBLICATIONS

Marc Rochkind, "How to Set Up an Affordable Hybrid Zoom Meeting." Downloaded from web page: https://community.zoom.com/t5/Meetings/How-to-Set-Up-an-Affordable-Hybrid-Zoom-Meeting/m-p/56161?attachment-id=1918, publication date: Apr. 24, 2022, 4 pages.
(Continued)

*Primary Examiner* — Gerald Gauthier
(74) *Attorney, Agent, or Firm* — Panitch Schwarze Belisario & Nadel LLP

(57) ABSTRACT

A camera is auto-focused on an in-person attendee in a hybrid meeting who is speaking into a microphone at a live location of the hybrid meeting, wherein the hybrid meeting is being streamed via a videoconferencing system to one or more remote attendees. The live location includes a real-time location system (RTLS) having a RTLS tag and a plurality of RTLS anchors for locating a position of the RTLS tag in three-dimensional space. The RTLS tag is fixed to the microphone. In operation, it detected when the microphone is active. The position of the RTLS tag in the live location is then identified, wherein the position of the RTLS tag in the live location is presumed to be the same position as the microphone that the RTLS tag is fixed to. The camera is auto-focused on the identified live location when the microphone is active, the camera thereby outputting a video signal of an area in the proximity of the microphone which is presumed to include an image of the in-person attendee who is speaking into the microphone. The live location camera image and the audio signal are then transmitted to the videoconferencing system for streaming to the one or more remote attendees.

14 Claims, 10 Drawing Sheets

(51) Int. Cl.
*H04R 1/08* (2006.01)
*H04N 23/611* (2023.01)

(58) Field of Classification Search
CPC ......... H04N 5/232127; H04N 5/23219; H04N 5/23299; H04N 7/142; H04N 7/147; H04N 7/15; H04R 1/08; H04R 5/04; H04R 2420/07; H04R 29/007; G06F 3/165; G06V 10/763; H04B 17/318
See application file for complete search history.

(56) References Cited

U.S. PATENT DOCUMENTS

| | | | | |
|---|---|---|---|---|
| 10,447,970 | B1 * | 10/2019 | Chu | H04N 7/147 |
| 11,107,490 | B1 | 8/2021 | Slotznick | |
| 2003/0048353 | A1 * | 3/2003 | Kenoyer | H04N 7/15 348/E7.081 |
| 2003/0090564 | A1 * | 5/2003 | Strubbe | H04N 7/142 348/E7.083 |
| 2011/0285808 | A1 * | 11/2011 | Feng | H04N 7/142 348/E7.083 |
| 2012/0062729 | A1 * | 3/2012 | Hart | H04N 7/142 348/135 |
| 2018/0098145 | A1 * | 4/2018 | McGary | G06F 3/165 |
| 2018/0329896 | A1 * | 11/2018 | Goethals | G10L 13/00 |
| 2019/0019494 | A1 * | 1/2019 | Wheeler | G10L 15/22 |
| 2019/0208381 | A1 * | 7/2019 | Booij | G01S 1/725 |
| 2020/0351435 | A1 * | 11/2020 | Therkelsen | H04N 5/23299 |
| 2021/0037337 | A1 * | 2/2021 | Park | H04R 29/007 |
| 2021/0306803 | A1 * | 9/2021 | Swart | H04B 17/318 |
| 2021/0399911 | A1 * | 12/2021 | Jorasch | H04L 65/403 |
| 2022/0224735 | A1 * | 7/2022 | Tokuchi | H04L 65/403 |

OTHER PUBLICATIONS

"Going Hybrid" Hybrid Meeting Setup and Tips, by Rotary District 5950 with contributions from Rotary Districts 5960 and 6690. Downloaded from https://portal.clubrunner.ca/50084/Documents/en-ca/bf9066b3-86d1-482e-bbfd-a80ce4f37357/1/ on Oct. 1, 2022. Document marked "Last updated Aug. 18, 2020". Original posting date: unknown, 2 pages.

Meeting Owl 3, product description from Owl Labs. Downloaded from https://resources.owllabs.com/hubfs/website/pdps/mo3%20datasheet/datasheet_mo3_en.pdf on Oct. 1, 2022. Copyright 2022. Original posting date: unknown, 3 pages.

"Getting Started with Zoom Rooms", product description from Zoom Support at Zoom Video Communications, Inc. Downloaded from https://support.zoom.us/hc/en-us/articles/207483343-Getting-started-with-Zoom-Rooms on Oct. 1, 2022. Document marked: last update Mar. 22, 2022. Original posting date: unknown. 3 pages.

"Getting Started with Smart Gallery", product description from Zoom Support at Zoom Video Communications, Inc. Downloaded from https://support.zoom.us/hc/en-us/articles/4403190845069-Getting-started-with-Smart-Gallery on Oct. 1, 2022. Document marked: last update Jun. 27, 2022. Original posting date: unknown, 4 pages.

"All You Need to Know About Smart Gallery and Why It's Changing Hybrid Meetings", by Cynthia Lee, product description on Zoom Blog at Zoom Video Communications, Inc. Downloaded from https://blog.zoom.us/all-you-need-to-know-about-smart-gallery/ on Oct. 1, 2022. Article dated: Dec. 8, 2022, 3 pages.

"Zoom Rooms Design Guide", product support from Zoom Support at Zoom Video Communications, Inc. Downloaded from https://support.zoom.us/hc/en-us/articles/360021724691-Zoom-Rooms-Design-Guide on Oct. 1, 2022. Last update Jul. 25, 2022. Original posting date: unknown, 2 pages.

Photo of Classroom at the Penn State Law School, in State College, Pennsylvania. Image of Penn State Law School classroom/lecture hall is embedded in the page: https://pennstatelaw.psu.edu/academics/research-centers. Image url:https://pennstatelaw.psu.edu/sites/default/files/styles/content_header_image/public/PSL_Students_in_classroom_0.ong?itok=5kFmDfyJ, downloaded Oct. 1, 2022. Page copyright 2019. Date at which picture taken: unknown, 1 page.

Wikipedia entry for "Real-time locating system." downloaded from web page: https://en.wikipedia.org/wiki/Real-time_locating_system, download date: Aug. 22, 2022, page last edited: Jun. 24, 2022, 10 pages.

What is RTLS—Real Time Location System? Litum blog posting, downloaded from web page: https://litum.com/blog/what-is-rtls-rel-time-location-system-rfid/, publication date: Jul. 15, 2021, 14 pages.

"How a pair of microchips could transform football into an intricate dance of data", by Al Dellinger, posted on Daily Dot on Aug. 12, 2015, updated on May 18, 2021. Downloaded from https://www.dailydot.com/debug/nfl-rfid-player-tracking-zebra-technologies/ on Oct. 1, 2022. 6 pages.

Phenyx Pro PTU-5000A Quad-Channel UHF Wireless Microphone System, product description from Phenyx Pro. Downloaded from https://phenyxpro.com/products/ptu-5000a on Oct. 2, 2022. Original posting date: unknown, 3 pages.

Logitech Rally Camera, product description from Logitech, Inc. Downloaded from https://www.logitech.com/content/dam/logitech/en/video-collaboration/pdf/rally-camera.pdf on Oct. 2, 2022. Published Jun. 2018, 2 pages.

* cited by examiner

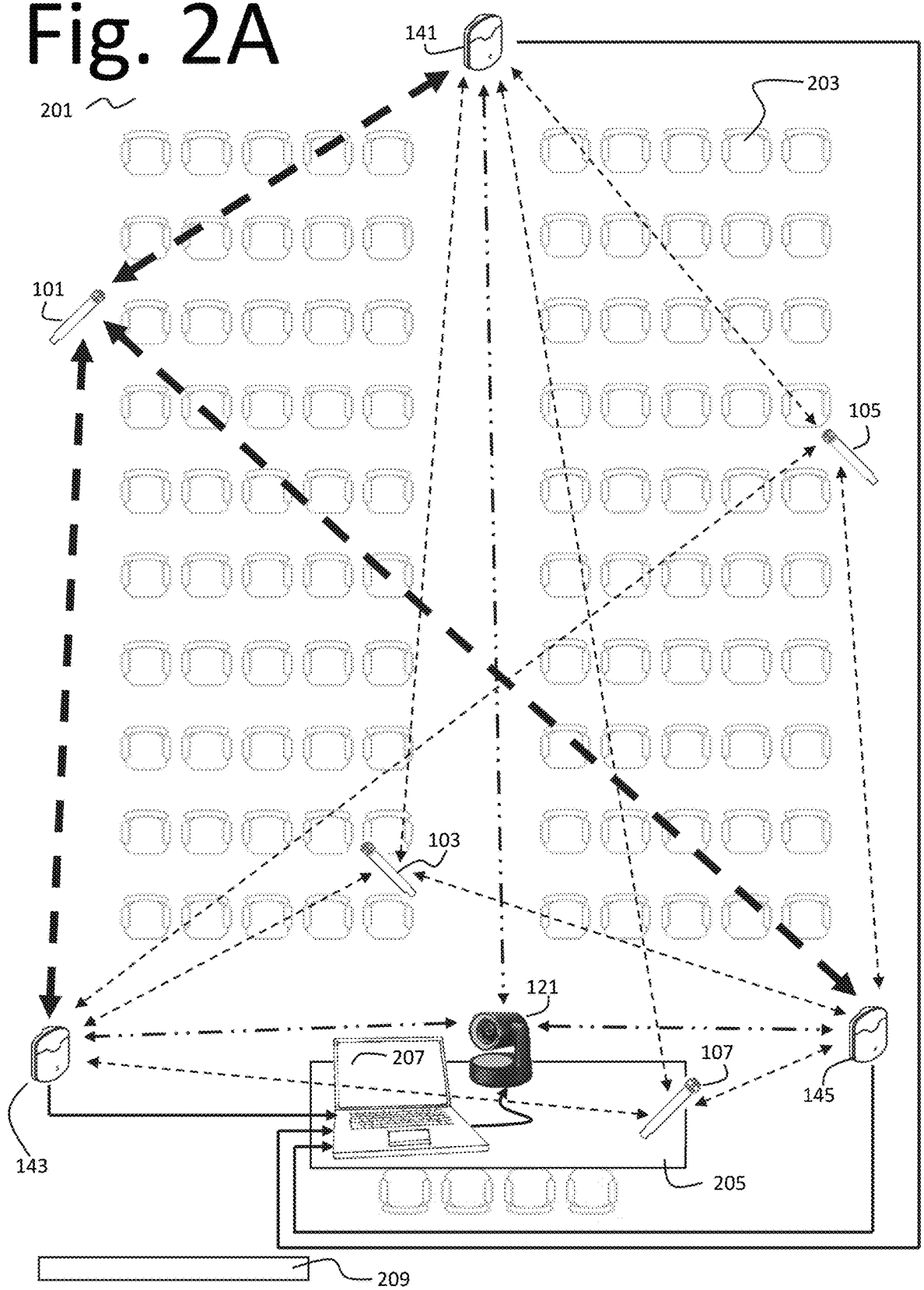

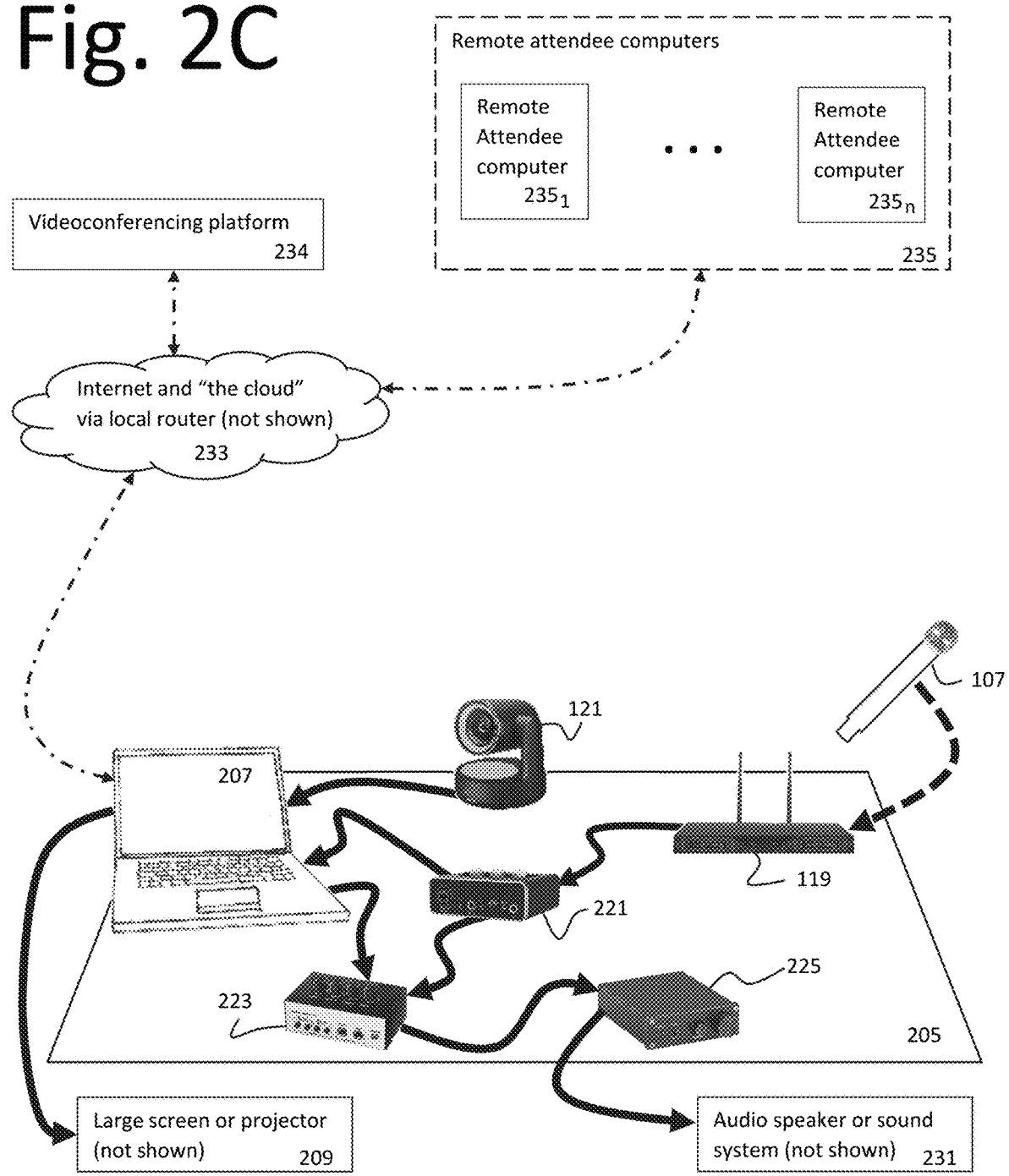

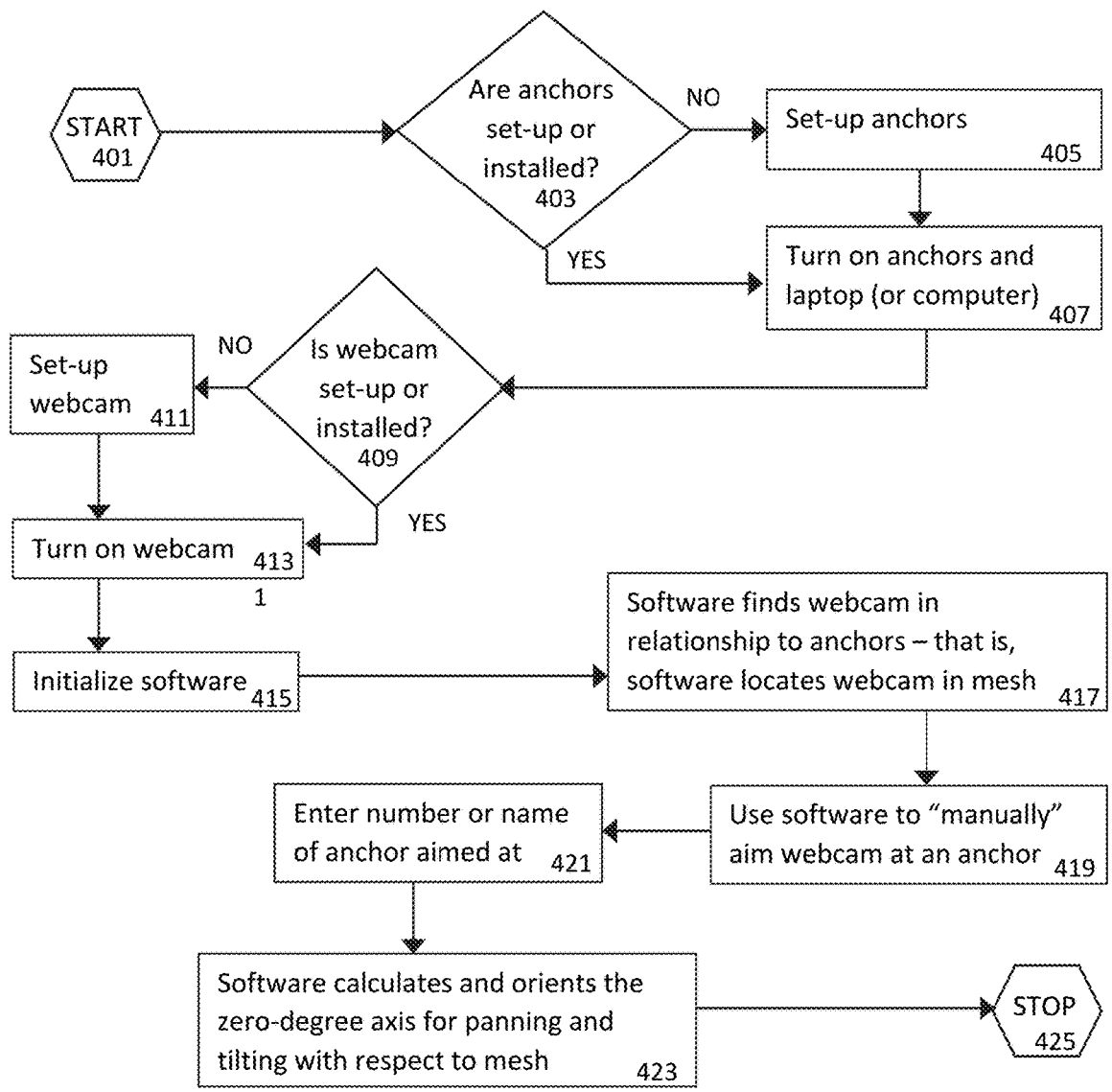
Fig. 4 Flow chart for calibration of RFID virtual mesh
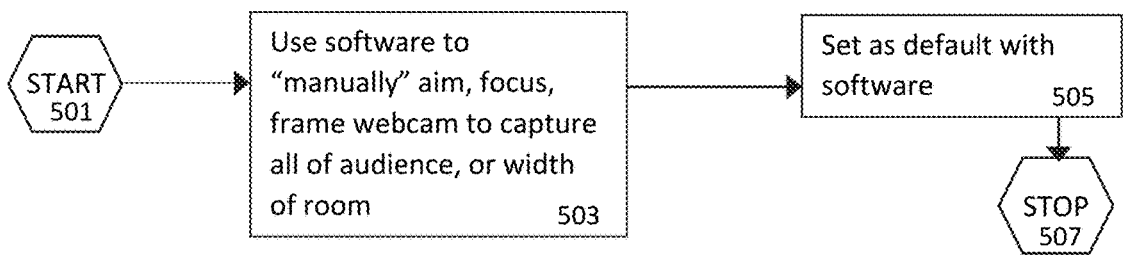
Fig. 5 Flow chart for setting default webcam view

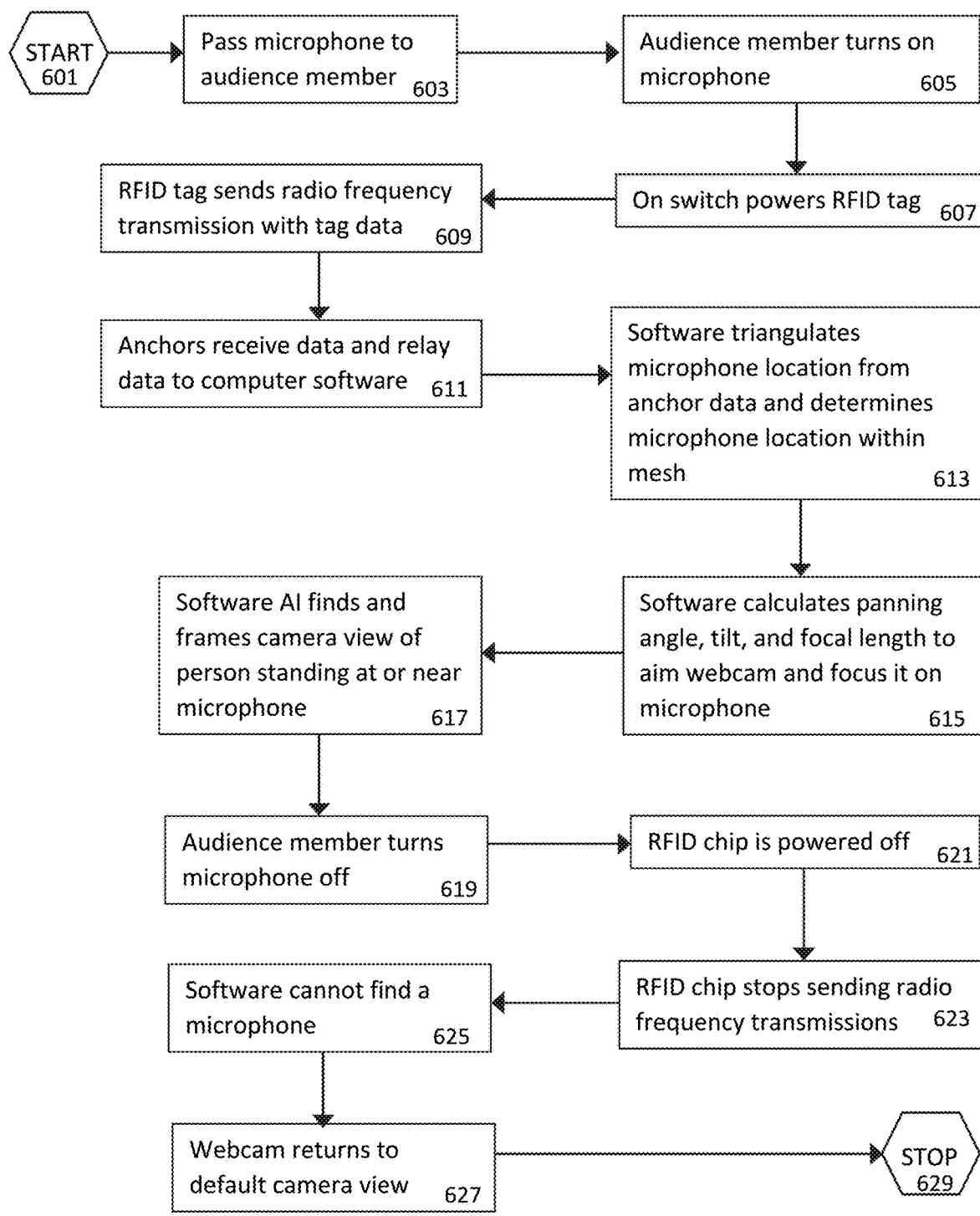
Fig. 6 Flow chart for automated focusing of webcam on audience member who is speaking

Fig. 8A  Microphone Locater System set-up
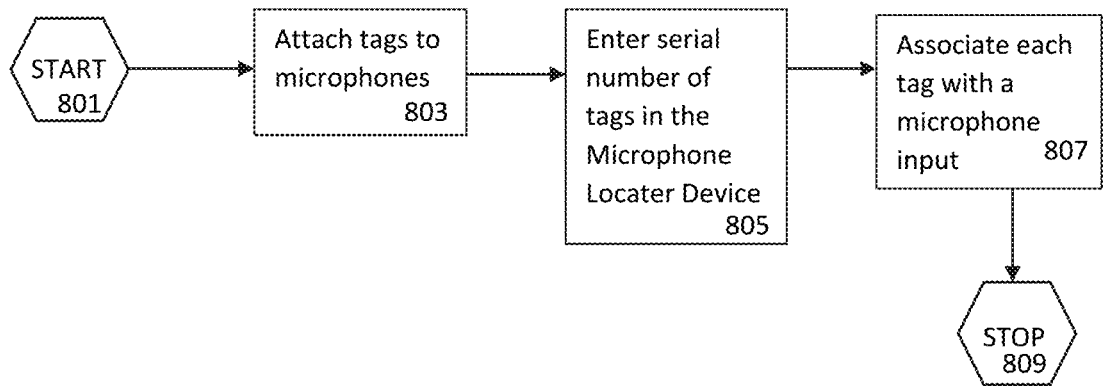
Fig. 8B  Processing within Microphone Locater Device
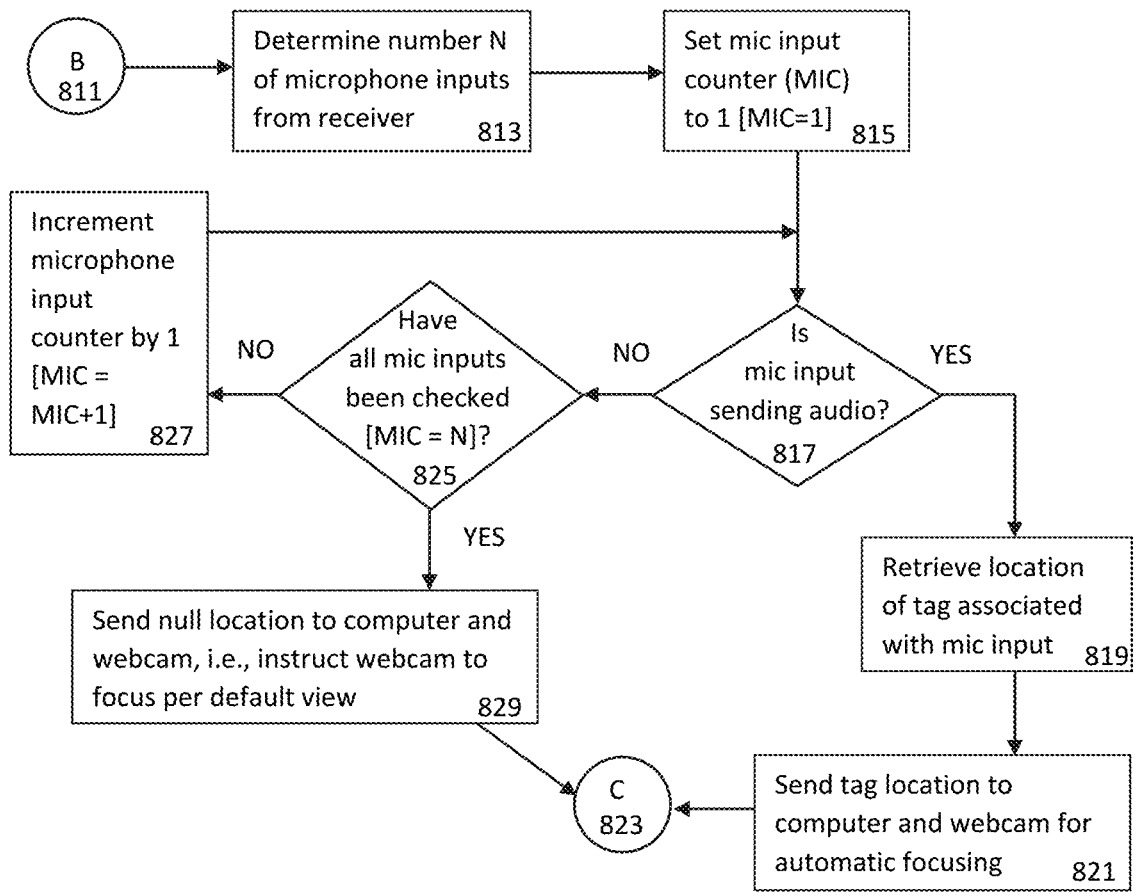

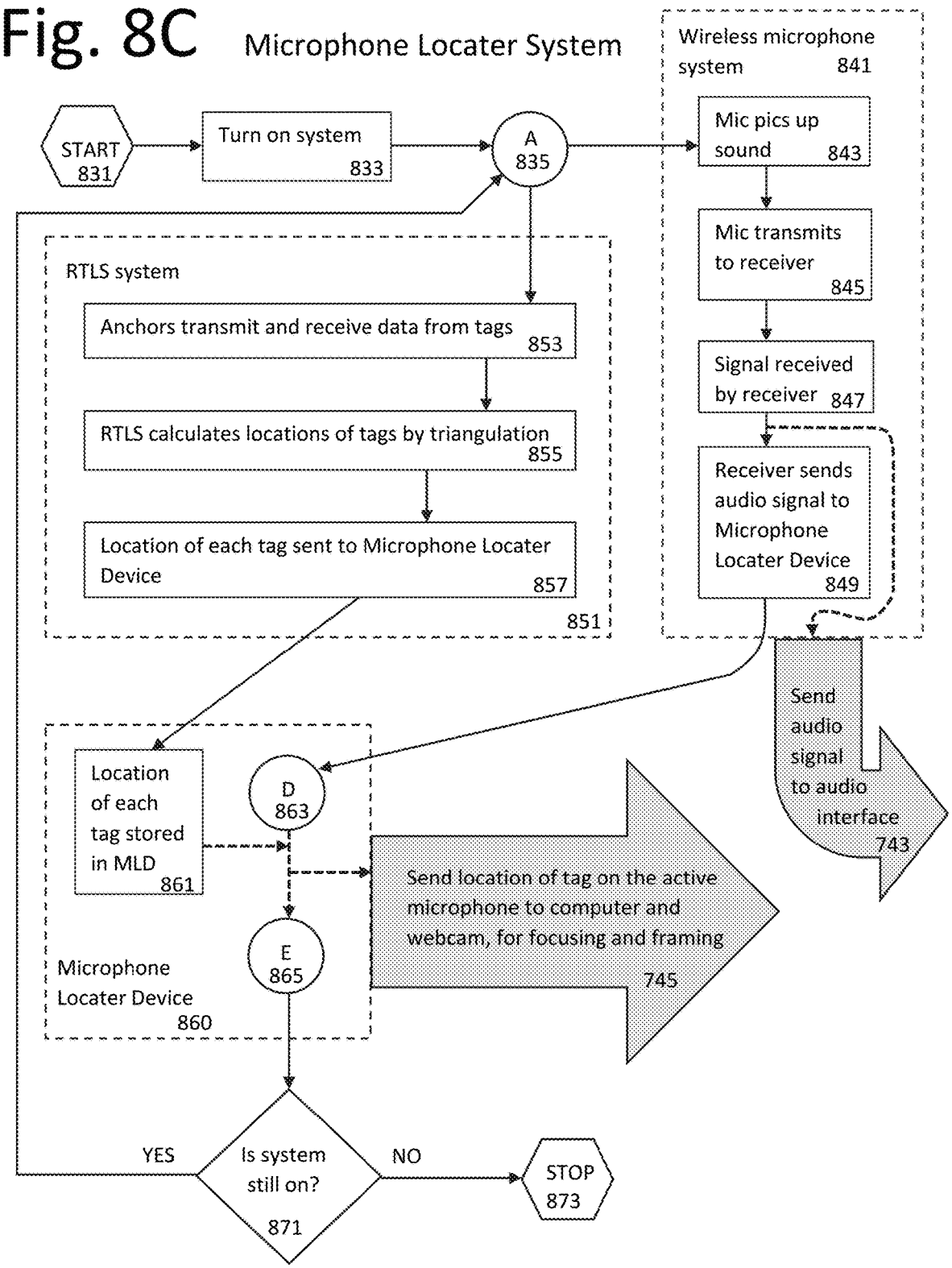

COMPUTER PROGRAM PRODUCT AND METHOD FOR AUTO-FOCUSING A CAMERA ON AN IN-PERSON ATTENDEE WHO IS SPEAKING INTO A MICROPHONE AT A HYBRID MEETING THAT IS BEING STREAMED VIA A VIDEOCONFERENCING SYSTEM TO REMOTE ATTENDEES

CROSS-REFERENCE TO RELATED APPLICATIONS

This application claims priority to copending U.S. Provisional Patent Application No. 63/400,790 filed Aug. 25, 2022, which is incorporated by reference herein.

BACKGROUND OF THE INVENTION

1. Introduction

The general field of invention is the technology to facilitate and enhance "hybrid" meetings—that is, gatherings of people where some participants attend in-person, and other participants attend virtually via an online videoconferencing platform such as (but not limited to) Zoom.

In 2020, the Covid-19 pandemic forced people and organizations to practice social distancing and avoid meeting in person. Instead, they met online virtually using videoconferencing platforms. Since then, with medical advances to combat Covid, (including both preventive measures such as vaccines, and medical treatments for those infected), many organizations have reverted to in-person meetings, while other organizations are experimenting with hybrid meetings and gatherings to accommodate more vulnerable or physically distant participants. People are finding that neither the meeting technologies and meeting protocols that worked for in-person meetings, nor those that worked for virtual meetings on Zoom, necessarily work for every hybrid meeting format.

The present invention provides novel and improved technology for hybrid meetings that (a) use an auditorium-style seating arrangement for the in-person component of the meeting, in which seats are arranged in rows, facing front, as in a theater, with the primary in-person speaker(s) generally at the front of the room (in contrast to a committee-style meeting where all in-person attendees are seated around a table), (b) allow speakers, panelists, and audience members to join the meeting from both the in-person component as well as virtually from online, (c) follow a meeting protocol where one person talks at a time, (d) allow the generally-more-passive audience members who are neither presenters nor panelists (whether the more-passive audience members are seated in the rows of seats or listening/attending online) to verbally ask questions or offer comments and be seen, and in-person audience members who comment are expected to stand while delivering comments.

One goal for hybrid meeting technologies and protocols is to create a level or equitable playing field for participation, so that every participant, whether attending in-person or attending remotely online, has an "equal" or "equivalent" experience, and "equal" or "equivalent" opportunity to participate. However, what "equal" and "equivalent" mean varies with meeting attributes such as (but not limited to) the number of attendees (in-person versus online), the size of room, the meeting format (e.g. a small "round table" committee discussion versus a large conference presentation to an audience in auditorium-style seating), the purpose of the meeting, and the technology budget (e.g. how many video cameras, video camera operators, and production engineers fit in the budget).

With respect to audio equality and inclusiveness, consider a speaker, (a) whether attending online or attending the meeting in-person, and (b) whether speaking from the lectern (dais, pulpit, rostrum or podium, or panelists table) at the front of the room, making comments from the back of a large room, or attending the meeting virtually from a distant location and speaking online over a videoconferencing platform such as (but not limited to) Zoom. Each speaker wants the audio of his or her words to be to be heard as well as any other speaker in the room or online, and wants his or her words to be clearly understood by members of both the online audience and the in-person audience. Similarly, a listener (whether attending in-person or online) wants to hear each speaker as well as any other speaker.

One particular set-up for a hybrid meeting that provides this audio equality is described clearly, concisely, and with diagrams by Marc Rochkind (https://community.zoom.com/t5/Meetings/How-to-Set-Up-an-Affordable-Hybrid-Zoom-Meeting/m-p/56161?attachment-id=1918). The set-up uses wireless roving directional mics, a USB audio interface, an audio mixer, an in-room speaker with amplifier, and a laptop computer connected to the internet and a videoconferencing platform such as Zoom. The meeting protocol requires handing the mics to in-person audience members, and instructing the audience how to speak clearly into them, along with the importance of connecting to the in-room speaker to provide audio feedback to in-person audience members who are speaking into the wireless mics. Importantly, this audio equality is delivered without requiring a production technician to be providing active audio mixing during the event. This type of set-up will be discussed in more detail below as prior art, in the context of FIG. 2C. However, as is obvious to those knowledgeable in the art, alternative equipment can be configured similarly to provide this kind of audio coverage for the in-person portion of a hybrid meeting and connecting the audio among the in-person and the online portions of the meeting.

With respect to video equality and inclusiveness, consider a speaker (a) whether attending online or attending the meeting in-person, and (b) whether speaking from the lectern at the front of the room while presenting to the audience in-person, making comments from the back of a large room, or speaking to the meeting virtually from a distant location via a videoconferencing platform. Each speaker wants any video of him or her (if allowed by the meeting host and format) to be as crisp, focused, prominent and visible to the featured speakers and panelists (and most often members of the online and in-person audiences) as the video of any other speaker in the room or online. And a viewer (whether attending in-person or online) wants to see each speaker as well as the other speakers.

Current technology does not provide this kind of video equality and inclusiveness for large auditorium-style meetings, at least not without expensive multiple cameras and camera operators, or expensive specially outfitted and engineered auditoriums (see discussion below). In contrast, most hybrid meetings that don't employ a video camera operator only deploy one fixed focus webcam. This may be aimed at the front of the auditorium to capture video of the featured speaker or panelists (for the in-person auditorium-style part of the meeting). Alternatively (as described in Marc Rochkind's set-up) this camera can focus on the in-person participants. Some installations allow the host/moderator/lead presenter to remotely move the focus of the webcam to different panelists or presenters.

Some meetings (or equipment installations for meetings) add a second fixed focus camera by using a smartphone which joins the virtual meeting on the videoconferencing platform separately, but without audio. See suggestions for hybrid set-up by the Minnesota Rotary Clubs: https://portal.clubrunner.ca/50084/Documents/en-ca/bf9066b3-86d1-482e-bbfd-a80ce4f37357/1/.

When the meeting employs two or more cameras, one camera faces and videos the speaker/panelist(s) at the front of the room and one camera faces and videos the audience. The camera facing the audience gives the online participants a sense of the in-person audience reactions and as well as video of any audience member who asks questions or offers comments.

The present invention works differently with respect to in-person audience members who offer comments or questions. When a participant from the audience at the in-person portion of the hybrid meeting is given the microphone to speak or make a comment, the present invention automatically provides a video feed to the videoconferencing platform that is focused on that participant. This video feed is similarly framed and formatted as the video feeds of the online participants provided by the videoconferencing platform. In other words, when a participant in the back of the audience is given the microphone, the video feed for that participant will not provide a long-shot of the whole room, in which it is hard to discern the facial features and conversational gestures of the participant who is talking. Rather the video feed will provide a close-up shot of the participant in which the participant's face and upper body will fill the frame—in a similar manner as if the participant was sitting or standing right in front of a webcam located on his or her desk during a Zoom videoconferencing meeting.

2. Background

Consider some very different current approaches to hybrid meetings: the Owl Labs webcam, similar Zoom Room Smart Gallery installations using webcams from a number of manufacturers (including DTEN, Neat, Poly, Logitech, and Yealink), and the hardwired lecture halls of the Penn State Law School.

Owl Labs Webcam: The Owl Labs webcam is a combination speaker-phone and 360° webcam, with a compact footprint (5"×5"×11" tall): https://resources.owllabs.com/hubfs/website/pdps/mo3%20datasheet/datasheet_mo3_en.pdf. It is designed to sit in the center of a conference table around which meeting participants are seated. (A set of tables arranged in a large circle or "U" shape will work similarly, and a single row of seats around that table may accommodate from 12 to 20 people.) The 360° webcam is located on the top of the device. The device includes three speakers providing 360° coverage and 8 omnidirectional microphones. The camera uses a fisheye-style lens processed through software to provide a panoramic view of the entire room.

In addition, the Owl Labs webcam can simultaneously provide up to three additional and separate video feeds of individuals who are speaking. It does this by using Artificial Intelligence (AI). It analyzes different microphone inputs to determine the direction from which the sound of a voice is coming. It analyzes the panoramic video feed to identify faces and upper bodies. It determines closest face/body to the perceived direction of vocal sound and provides a video feed framed on that face/body.

The owl is designed for small to medium conference rooms, not auditoriums. That is because the video pickup is only about 10 feet and audio pickup is only about 18 feet. In the context of a conference table around which participants are seated, approximate voice direction is sufficient to identify participants within 10 feet of the webcam. A large screen or monitor that displays the images of online meeting participants (those who are joining the meeting via a videoconferencing platform such as Zoom, Google Meets, or Microsoft's Teams) is positioned at one end of the table.

Zoom Rooms and Zoom Rooms Smart Gallery: The Zoom videoconferencing platform provides special software called Zoom Rooms. Zoom Room Smart Gallery is a feature of the Zoom Rooms software that works with certain specific third-party hardware, allowing the Zoom platform to display multiple video feeds from that hardware. Zoom Smart Gallery provides a similar experience to the Owl Labs webcam, but with the webcam mounted on the wall rather than placed in the middle of the conference table.

Zoom Rooms is designed for conference rooms more permanently equipped to provide "an integrated experience for audio conferencing, wireless screen sharing, and video conferencing" (https://support.zoom.us/hc/en-us/articles/207483343-Getting-started-with-Zoom-Rooms). The conference room will include a built-in or wall-mounted TV (screen, or monitor), camera, and computer, designed to work with the Zoom Rooms software and Zoom platform. The camera (webcam) is usually mounted just above or below the screen.

Zoom Smart Gallery is a special feature of the Zoom videoconferencing platform which allows Zoom to display multiple video feeds from specific approved webcams (sometimes called Zoom Room appliances) incorporated into a Zoom Room (and using a Zoom Rooms software license): https://support.zoom.us/hc/en-us/articles/4403190845069-Getting-started-with-Smart-Gallery. https://blog.zoom.us/all-you-need-to-know-about-smart-gallery/Zoom Smart Gallery currently supports specific appliances from several manufacturers including DTEN, Neat, Poly, Logitech, and Yealink: https://support.zoom.us/hc/en-us/articles/4403190845069-Getting-started-with-Smart-Gallery.

The Zoom Rooms hardware designs are intended for a range of room sizes: from huddle rooms (up to 7 people), conference rooms (up to 12 people), boardrooms (up to 22 people) and classrooms (up to 25 people): https://support-.zoom.us/hc/en-us/articles/360021724691-Zoom-Rooms-Design-Guide. This will not work for significantly larger spaces where microphones placed with the "webcam" at an end of the room (along with less precise room acoustics) do not provide sufficient audio separation for pinpointing the sound source.

Hard wired classrooms and lecture halls: The Pennsylvania State University (Penn State) located in State College, Pa., merged with Dickinson Law School in Carlisle, Pa. in 2000. Until 2014, the Penn State Law School operated as one law school with two campuses over 80 miles apart (approximately 2 hours driving distance): https://en.wikipedia.org/wiki/Penn_State_Law.

In 2009, when Penn State Law School built its Lewis Katz Building on Penn State's University Park campus in State College, the classrooms—from small seminar-sized conference rooms for a dozen or so students to larger capacity lecture halls (for approximately 50 to 75 students)—were all wired for videoconferencing to link and meld the two campuses. See for example https://pennstatelaw.psu.edu/sites/default/files/styles/content_header_image/public/PSL_Student s_in_classroom_0.png?itok=5kFmDfyJ.

In smaller classrooms, when a student speaks, the audio and video equipment will operate like a Zoom Room, and the video camera will focus on the speaking student based upon "triangulating" the audio input. In the larger lecture halls, each desk has a switch to turn on a microphone built into the desk in front of the student (for use when the student has been called on by the teacher). As the student switches on the microphone, the webcam at the front of the classroom will pivot and focus on that location using a motor-operated cradle/yoke for the webcam and based upon pre-programmed positions. One skilled in the art understands how this approach can be used for larger lecture halls and auditoriums.

However, this approach does not work for meetings which are held in general-purpose auditoriums, without microphones and switches at each seat. This approach also does not work where meetings are held in large general-purpose rooms (such as at hotel convention centers) where seats are provided by setting up folding chairs in auditorium-style rows.

Remotely focusing a webcam: The examples above detail several of the ways in which webcams can be positioned, aimed, and focused remotely. As known to those skilled in the art, webcams can be positioned by servo-motors swiveling the webcam mount in the x and y dimensions. Servo motors can also be used to optically move the webcam lens in and out as well, to achieve the correct focus for objects different distances from the camera. This focus can be done manually (with a camera operator's eye) or using one of various autofocus systems, which are well known to those skilled in the art. The servo-motors can be controlled remotely and via software.

Aligning and focusing the camera by moving its position and lens is considered "optical" or mechanical focusing which does not affect the resolution of the produced image or video. Alternatively, a webcam image (or video) can be aimed or focused digitally. This is like editing in a photo editing program where a portion of a digital image is considered the entire image and the rest cropped out. This results in a loss of pixels (loss of image resolution), compared to the original image, but is done using software only. Aligning and focusing a camera may involve both optical and digital components.

Security cameras are often aligned and focused based upon a noise, or movement. Some webcam software uses virtual reality and augmented reality principles to recognize the image/outline of a human face, torso, or other body part (see for example Snap Camera and Snap Lens Studio by Snap). The software then enables the camera to focus on that body part, or creates images in which the modeled body part fills a pre-specified portion of the image frame.

Locating objects using RFID chips: Electromagnetic waves, such as (but not limited to) those produced by Radio Frequency Identification (RFID) chips, Bluetooth devices, BLE (Bluetooth Low Energy chips), and GPS devices can be used to locate objects. In particular consider active RFID chips, which are battery powered. The signals of some (depending up on the frequency generated) have a range of hundreds of feet and their positions can be pinpointed within inches using triangulation: https://en.wikipedia.org/wiki/Radio-frequency identification. The range of active RFID chips (and some battery assisted passive chips) is comparable to the range of wireless microphones used in hybrid meetings such as (but not limited to) those recommended by Marc Rochkind.

RFID chips, embedded in tags or transponders are used in industry for warehouse and inventory control through a combination of hardware and software called Real-Time Location System (RLTS), also known as a Real-Time Tracking System. Per the Litium website (https://litum.com/blog/what-is-rtls-real-time-location-system-rfid/), the RLTS system creates a wireless mesh network (and virtual grid representation of it) by placing anchors (active RFID readers or interpreters) at key fixed reference points in a facility. These anchors send and receive radio signals, recognizing active RFID tags every time they come within the range of the anchor.

When the anchors get a signal from an RFID tag, the location of the tag can be calculated by using triangulation, received signal strength (RSSI), time difference of arrival (TDOA), or similar methods known to those skilled in the art. This calculation is done by a location engine, which is a part of the RTLS software.

For a dynamic example, in 2015, the National Football League (NFL) equipped its football players with RFID chips that measured speed, distance and direction traveled by each player in real-time.

The chip triangulated the NFL player's position within six inches and was used to digitally broadcast replays. See https://www.dailydot.com/debug/nfl-rfid-player-tracking-zebra-technologies/. In contrast, using triangulation of sound waves to locate a sound source in an acoustically active (or live) room may be less precise or less practical at such long distances.

The disclosure below uses the term RFID for chips, tags and anchors. However, as is known to those skilled in the art, there are other types of wireless tags used in real-time location systems, such as WiFi tags, and UHFID tags. Reference to one, is intended to include wireless chips and tags which utilize other wireless frequencies, technologies, and standards. These tags are collectively referred to herein as "RTLS tags."

SUMMARY OF THE INVENTION

The invention is a system (apparatus) for auto-focusing a webcam on speakers in a hybrid meeting held in a large room with auditorium-style seating. In such a room, a member of the audience cannot be heard without standing up and speaking into a microphone. (Without amplification, neither other members of the in-person audience, nor members of an online audience, can hear him or her.) The present invention uses this principal to enable a webcam to automatically focus on (or zoom in on) the speaking audience member by (a) attaching a "homing" chip (such as in an RFID tag) to the microphone, (b) deploying triangulating sensing devices within the room (such as RFID anchors and interrogators) to measure the distance of the chip from those devices (that is, locate the chip within the confines of the room), and then (c) utilize software to instruct a remotely controllable webcam to aim at and focus on that location in the room and zoom in or frame the camera shot (the video feed) on the person holding the chip. The invention can also be used similarly to focus a webcam on different panelists at the front of the room, as they speak into different mics or pass the mic among them.

In a preferred embodiment, the invention is a system of interconnected audio and video equipment with triangulating control software. The system consists of at least one handheld wireless mic and at least one webcam and several chip anchor/readers. The wireless microphone has an embedded chip that when activated sends signals to a set of microwave readers or anchors. The triangulating software establishes the location of the microphone in relationship to the anchors and the webcam (which may also have a similar embedded chip) and sends instructions to the webcam servomotors or digital focusing software to frame and focus the webcam on the face and upper torso of the person standing at or near the calculated location of the microphone. (This face and body detection further improves the video being captured from the speaker.) The audio from the handheld microphone combined with the video feed from the webcam allows members of the in-person audience at a hybrid videoconference meeting to participate equally in the meeting (with respect to both their audio and their video) with online participants.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 2A is generalized overhead schematic room plan, showing a panelist/speaker table at the front of the room and auditorium-style seating for the audience, along with a set of microphones as shown in FIG. 1A, a webcam as shown in FIG. 1B, three RFID anchors as shown in FIG. 1C, and a laptop computer with software for locating RFID chips and remotely controlling the webcam. Data flows among these devices are also shown.

FIG. 2C shows equipment used for the audio and video in this hybrid meeting, along with data flows among them. Included are one of the microphones shown in FIG. 1A and the webcam shown in FIG. 1B.

FIG. 4 is a flow chart for calibration of the RFID virtual mesh by which the webcam is located within the mesh.

FIG. 5 is a flow chart for setting the default webcam view illustrated in FIG. 3A.

FIG. 6 is a flow chart for automated focusing of the webcam on an audience member who is speaking into microphone shown in FIG. 1A.

FIG. 8A is a flow chart for setting up the alternative embodiment shown in FIG. 7.

FIG. 8B is flow chart for processing information within the Microphone Locater Device shown in FIG. 7.

FIG. 8C is a flow chart for processing information among the component systems of the Microphone Locater System shown in FIG. 7.

DETAILED DESCRIPTION OF PREFERRED EMBODIMENTS

Figure 1A:
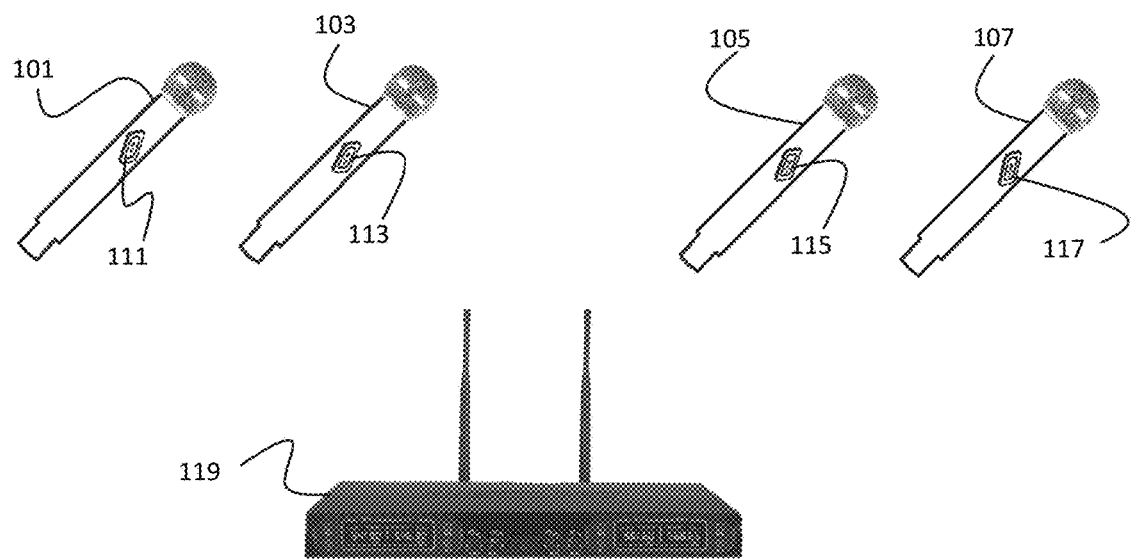
FIG. 1A shows a wireless microphone set with receiver, with an RFID chip embedded in each mic.

Certain terminology is used herein for convenience only and is not to be taken as a limitation on the present invention. The words "a" and "an", as used in the claims and in the corresponding portions of the specification, mean "at least one."

DEFINITIONS hybrid meeting—As discussed above, a hybrid meeting is gathering of people where some participants attend in-person, and other participants attend virtually via an online videoconferencing platform such as (but not limited to) Zoom. The in-person participants are also referred to herein as "in-room" participants.

live location—A live location is the location where the in-person participants attend the hybrid meeting, in contrast to one or more "remote locations" where the participants attending virtually (online) are located.

attendee—An attendee is a person who attends a conference or other gathering. The attendee may be a participant, audience member, speaker, or panel member of the conference or gathering.

voice-activated microphone—a voice-activated microphone is a microphone that relies upon a predefined threshold and other intelligence to determine when the audio signal of the microphone is indicative of a deliberate utterance (a likely spoken sound), as opposed to ambient noise, faint voice signals, or other background noise.

live microphone—a "live microphone" is a microphone that is turned on, as opposed to being turned off. It is sometimes referred to as a "hot mic."

active microphone—an "active microphone" as used herein is a microphone that one of the in-person attendees is about to speak into, or is currently speaking into, and which outputs an audio signal that is intended to be streamed to remote attendees via the videoconferencing system and is also intended to be broadcasted to the in-person attendees. The in-person attendee may be physically holding the microphone, or speaking into a stationary microphone, or a facilitator who is holding the microphone may be in sufficiently close proximity to the in-person attendee so that any utterances of the in-person attendee are captured by the microphone. The microphone may become "active" in any number of ways, including the following ways:

i. the microphone may be made "live" by turning it on.

ii. if the microphone is voice-activated, the microphone may become "active" when it determines that the audio signal of the microphone is indicative of a deliberate utterance. A microphone may be "active" but the RTLS tag may be separately controlled (i.e., turned on and off) by its own switches or the like. Alternatively, the RTLS tag may be automatically turned on when the microphone becomes active by either of the ways described above, and may be automatically turned off when the microphone is not active. To minimize lag time when it is necessary to focus a camera on a specific in-person attendee, it may be desirable to continuously monitor the location of the RTLS tag by leaving it in an "on" state so that the current location is instantly available for camera focusing when or if the microphone becomes "active."

Disclosure

Consider first the special equipment used for the present invention, which is not usually used for in-person meetings or online-only meetings.

FIG. 1A shows a set of wireless microphones, 101, 103, 105, and 107 and the receiver (119) for them. Each microphone has an embedded chip and antenna such as used in an RFID tag. (Tag 111 is embedded in microphone 101, tag 113 is embedded in microphone 103, tag 115 is embedded in microphone 105, and tag 117 is embedded in microphone 107.) Each chip/tag has a unique identifying number which the chip broadcasts when energized. These particular microphones are similar to the Phenyx Pro Quad Channel Wireless Microphones which have a range of several hundred feet. Each microphone can send its audio data to the receiver on a different radio frequency. For some embodiments of the present invention this is important, for others, the mics can all send audio data on the same frequency. For some implementations a multi-microphone system is important, but for other embodiments, a system with a single microphone is sufficient.

Active RFID tags, and battery-assisted passive RFID tags have ranges of several hundred feet, comparable to the broadcast range of the Phenyx Pro Quad Channel Wireless Microphones.

These tags shown in FIG. 1A are embedded in and integral to the microphone. However, in alternative embodiments the unique tags can be attached to the microphones by a user, who purchases them separately. Broadly speaking, the RTLS tags are "fixed" to their respective wireless microphones which includes the embedded/integral embodiment and the simpler attachment embodiment.

Figure 1B:
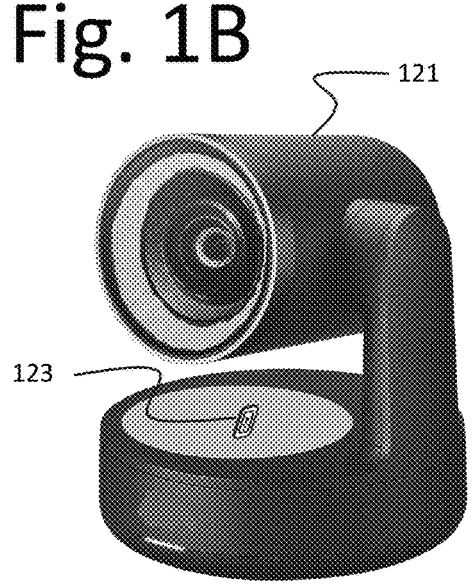
FIG. 1B shows a remotely controllable webcam with an embedded RFID chip.

FIG. 1B shows a webcam 121 with an embedded chip and antenna such as used in an RFID tag 123. The webcam is similar in resolution and capabilities to the Logitech Rally Camera (Premium PTZ camera with Ultra-HD imaging system and automatic camera control). The Logitech Rally Camera has a zoom capability of 15×; a pan capability of 180° (±90° from a central vertical axis), tilt capability of 80° (+35° to −45° from a horizontal axis). As known to those skilled in the art, other applicable webcams useable with the present invention have similar or different capabilities. For example, a 360° camera, such as used in the Owl Labs webcam, could be used if it has sufficient optics and resolution for digital focusing in a large room.

In FIG. 1B, the tag is shown as embedded in and integral to the webcam. However, in alternative embodiments of the present invention the tag is attached to the webcam by a user who purchases it separately. In other alternative embodiments, discussed below, the tag is omitted.

Figure 1C:
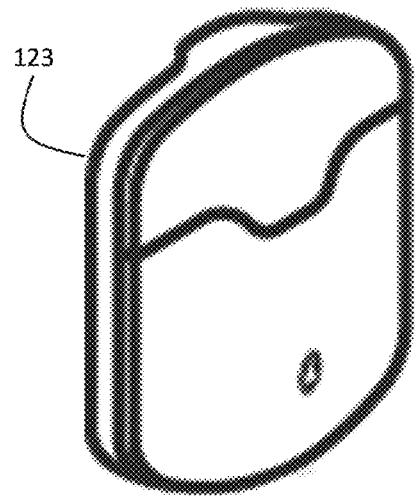
FIG. 1C shows a illustrative RFID anchor or interrogator, used for triangulating an RFID tag.

FIG. 1C shows an RFID anchor, 141, also known as a reader or interrogator, similar in form to those made by Litum, but with capabilities engineered for the present invention. Anchors can be active (sending radio frequency waves to RFID tags, which send a reply with their identity or stored data, powered in whole or part by the energy sent by the anchor), passive (receiving radio frequency waves beamed by active tags), or some mix.

Figure 2B:
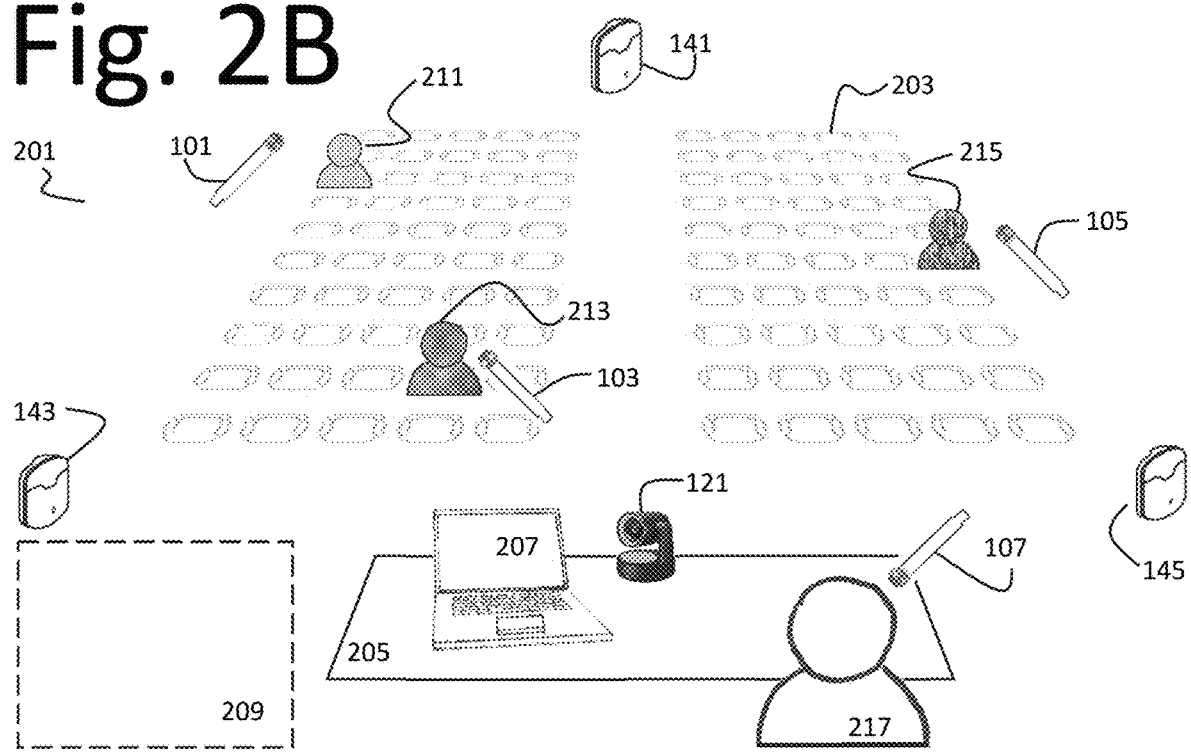
FIG. 2B is a perspective view of the room shown in FIG. 2A, from the point of view of a panelist or speaker. A panelist/speaker and three audience members are also shown.

Consider now how this equipment is deployed in a large room with auditorium-style seating, as shown schematically using an overhead view in FIG. 2A and a perspective view in FIG. 2B. To help illustrate the room in perspective, several people are shown schematically in FIG. 2B, but not in FIG. 2A.

A large room, 201, is set up for a presentation using rows of seats, such as seat 203, set-up in auditorium-style seating. That is, the seats are arranged in rows facing the "front" of the room where the presenters speak. In FIG. 2A and FIG. 2B a desk or table, 205, for panelists to sit or stand behind, is shown at the "front" of the room. (FIG. 2A shows chairs behind the speaker's table; for ease of illustration but without loss of generality, FIG. 2B does not.) Without loss of generality, instead of a table, 205, the room could have a lectern, podium, dais, or pulpit. Seats may be permanently affixed such as in an auditorium, or they may be folding chairs such as used for large meetings in many hotel ballrooms and convention centers.

FIG. 2A and FIG. 2B illustrate a room with 100 seats in the audience, but that number was chosen for ease of illustration only, and could be more or less. Rows of folding chairs are generally spaced 36 inches from the back of one row to the back of the next. Folding chairs are typically 18 inches wide. The schematic shown in FIG. 2A and FIG. 2B shows a room approximately 30' by 50', well within the capabilities of microphones such as the Phenyx Pro Quad Channel Wireless Microphones, which can cover serve a room several times this size.

RFID anchors: The room is shown with three RFID anchors, 141, 143, and 145. Each is similar to FIG. 1C, 141, but with a different unit number for use in triangulation calculations. A larger room might require additional anchors, depending upon their range.

The anchors are shown as portable and free standing, with their own stands. They are powered by electric cables connected to electric power sockets. They send their data via data cables, shown as solid lines in FIG. 2A. (These data flows are not shown in FIG. 2B, the perspective view of the room.) In an alternative embodiment, the anchors are built-into the room (for example, mounted on the walls or ceiling of the room) and hardwired for both power and data transmission. In an alternative embodiment, anchors are powered by batteries, and transfer data wirelessly, such as via wifi, in which case the room or installation would employ a wifi router (not shown).

The anchors are shown connected to a laptop computer, 207, but may alternatively first be connected to a USB interface or other device (not shown) which allows their data to be fed to the computer via USB connections.

Webcam and Laptop: The room is shown with a laptop computer, 207, and a webcam, 121, set on the speakers table, 205. The webcam contains an embedded chip (see FIG. 1B, 123, but too small to be shown in FIG. 2A or FIG. 2B) The webcam, 121, is shown as connected to the laptop, 207, via a data cable.

Alternatively, the webcam is built-into the room (for example, mounted on a wall facing the audience or hung from the ceiling of the room) and hardwired for both power and data transmission to a built-in computer. In an alternative embodiment, the webcam is powered by batteries, and transfers data wirelessly, such as via wifi, in which case the room or installation would employ a wifi router (not shown).

The webcam, 121, is shown as being aimed, focused, and zoomed via commands sent through a data cable between it and the laptop, 207. Alternately, or in addition, as is known to those skilled in the art the webcam may be aimed, focused, and zoomed via an app on a smart phone, a separate control computer, a hand held control pad operating wirelessly (such as via infrared, Bluetooth, or wifi), or via directional switches on the webcam itself. In alternate embodiments, the aiming, focusing, and zooming commands are sent wirelessly from the laptop or computer.

The laptop in addition, may have one or more webcams built into it as well, but they are not shown.

In FIG. 2A, the radio frequency waves sent by the RFID chip embedded in the webcam are shown as dashed lines connecting the webcam, 121, to the three RFID anchors, 141, 143, and 145. (These data flows are not shown in FIG. 2B.) These dataflows are used to determine the position/location of the webcam within the room RLTS grid, using the RLTS software in the laptop, 207, based upon information which the anchors, 141, 143, and 145 obtained from the RFID chip 123 embedded in the webcam 121, as well as the calculated orientation of the panning axes of the webcam with respect to the grid. (See FIG. 4 discussed below.)

In an alternative embodiment, the webcam, 121, as well as anchors 141, 143 and 145 are permanently affixed to walls or the ceiling, and the actual distance of the webcam from the anchors (as well as orientation of the webcam with respect to the anchors) is entered into the software. In this situation, the webcam does not need an RFID chip or tag. Affixing the webcam to the wall or ceiling will also fix its pan and tilt axes, as discussed below, and then need not be determined by calibration per FIG. 4.

The panelists/speakers see the online participants by looking at the screen of the laptop, 207.

The large screen: A large screen monitor, 209, is positioned at the front of the room, 201. It displays a copy of what is shown on the screen of the laptop, 207, and is positioned so that audience members (such as a person sitting in seat 203) can see the online participants clearly. In FIG. 2A and FIG. 2B, the large screen is shown as positioned behind the speakers/panelists, but alternatively, it is positioned above them, or on a side wall. The large screen is shown as a free-standing device, but alternatively it is built into the room. The large screen is shown as an active device such as a television monitor, but alternatively, it is reflective surface or wall upon which images are projected by a digital projector (not shown) connected to the laptop, 207, via wire or wirelessly. Such a digital projector is a portable device, or alternatively, built into the room.

Wireless Microphones: The heart of the system is the wireless microphones, 101, 103, 105, and 107, with embedded RFID chips/tags. The chips/tags are shown as 111, 113, 115, and 117 in FIG. 1A, but are too small to show in FIG. 2A and FIG. 2B. The microphones are hand-held and powered by batteries so they are portable. When deployed, they are passed from one person to another. Alternatively, an assistant or volunteer, carries a microphone to an audience member wishing to speak. Alternatively, the microphones are set into microphone stands and placed in the aisles between the rows of seats, in which case the microphones are stationary, and audience members must approach them to speak. Alternatively, when the microphones are stationary, they may be hardwired.

When activated, the RFID tag sends (broadcasts) a radio frequency signal to all anchors. For example, microphone 101 sends a signal to anchors 141, 143, and 145 when its RFID tag 111 is activated. Microphone 103 also sends a signal to anchors 141, 143, and 145 when its RFID tag in 113 is activated. Microphone 105, when activated, sends a signal to anchors 141, 143, and 145, when its tag 115 is activated; and microphone 107, sends a signal to anchors 141, 143, and 145 when its tag, 117, is activated.

(Remember that under the meeting protocol for large meetings with few presenters and an audience seated in auditorium-style seating, only one microphone for audience inputs is turned on at a time. In a preferred embodiment, turning on the microphone also supplies battery power to the RFID chip. So, in this preferred embodiment, a microphone's chip is activated only when the microphone is turned on.)

The microphone RFID tag signals are shown in FIG. 2A as the dashed lines from the microphones to the anchors. The data flows of the microphone's RFID tag signals are not shown in FIG. 2B.

Other audio and video equipment: Consider now FIG. 2C which shows audio equipment for a hybrid meeting. The equipment may be placed on speaker's table 205, or under it. In alternate embodiments, the equipment is built into the room sound system. This equipment is based upon providing audio for a simple hybrid meeting per Marc Rochkind referenced above. Those skilled in the art will appreciate that various modifications and variations may be made to this equipment without departing from the scope and spirit of this invention.

When someone turns on a microphone, such as 107, and speaks into it, the microphone does two things. The microphone's tag sends a radio frequency signal to the anchors (141, 143, and 145) so they can determine its location in the room, but the microphone also converts the sound waves that the speaker creates into digital audio waves, and transmits them to the receiver, 119. The receiver sends this data to a USB audio interface, 221, which converts the audio wave into a digital form that can be inputted into a computer via a USB cable.

Importantly, this digital audio is sent two places. It is sent to the computer, 207, which transmits it to the hybrid meeting's online vidoconferencing platform (such as Zoom) on the internet (233) or a similar type of electronic network, so that online participants can hear the in-room produced audio. It is also sent via mixer, 223, and amplifier, 225, to an audio speaker (or audio sound system) in the room, 231, so that the audience in the room can hear what the person at the microphone is speaking into the microphone, 107. As mentioned previously, even in a small room, this is important. If a person speaking near the microphone does not hear audio feedback (by this is meant an amplified version of his or her voice, not the screech from the feedback loop of an improperly adjusted equipment setup), the speaker will not know if a microphone, particularly a directional mic (like the Phenyx Pro Quad Channel wireless mics), is accurately capturing and transmitting the speaker's voice.

The other audio—the audio from the online participants of the hybrid meeting—is transmitted from the internet (233) via videoconferencing platform (234) to the laptop, 207. From there it is sent to the audio mixer 223, and then on to the amplifier, 225 and sound system, 231.

In one non-limiting embodiment, the videoconferencing platform (234) may be the videoconferencing platform described in U.S. Pat. No. 11,107,490 (Slotznick), which is incorporated by reference herein. As shown in FIG. 2C, the videoconferencing platform (234) is in communication via an electronic network such as the internet (233) with a plurality of remote attendee computers 235, each of which receives a stream of the hybrid meeting.

In similar manner, prior art, such as Marc Rochkind, has integrated the audio of the in-person and online portions of a hybrid meeting. As those skilled in the art know, the laptop, 207, or other computer, can be connected to the internet (233) in a variety of ways, including but not limited to hard-wired ethernet and wireless wifi. Consequently, the details of this connecting system are not shown in the figures.

With respect to video, video from the online participants of the hybrid meeting is transmitted from an electronic network such as the internet (233) via the videoconferencing platform (234) to the laptop, 207, where it is shown on the laptop's screen (not labeled separately) for the speaker or panelist to see. The laptop sends a copy of that image/video to a larger screen or projector (209) for the in-person audience, seated in the auditorium-style seating (such as 203 in FIG. 2A and FIG. 2B) to see.

Video from the in-person in-room portion of the hybrid meeting is captured by the webcam, 121, sent to the laptop, 207, where it is transmitted via the videoconferencing platform (234) through an electronic network such as the internet (233) to the online participants and their computers (235) in the hybrid meeting.

Before discussing how the present invention determines what the webcam, 121, captures and how the webcam frames the video that it sends, additional explanation is provided regarding calibrating/locating/orienting the webcam in relationship to the radio frequency mesh established by the anchors and the virtual room dimensional grid that the RLTS software created from the data received by the anchors.

Calculating and locating the webcam panning axis: Consider FIG. 4 which is a flow chart for that calibration, designed for use with portable or permanent equipment. As the process starts, 401, the first question (403) is whether the anchors (141, 143, and 145) have been set up or installed. If not, then they have to be set up, 405, then turned on along with the laptop (207), step 407. In contrast, if the anchors had been set up (403), then again, they must be turned on along with the laptop (step 407).

The next question is whether the webcam has been set up or installed (408). If not, the webcam has to be set up (411), and then turned on (413). This will also turn on the RFID chip embedded in the webcam. On the other hand, if the webcam has been set up, then again, it has to be turned on, 413. Next the RLTS software has to be initialized, 415. This software creates a dimensioned grid, based upon data from the anchors (141, 143, and 145). At this point the only data being received is from the webcam (121) and its RFID tag (123). Using this data (radio frequency data flows from RFID tag 123 embedded in webcam 121, to anchors 141, 143, and 145; data flows shown in FIG. 2A), the RLTS software locates the position of the webcam in the virtual grid with respect to the anchors (step 417). However, this does not establish the orientation of the webcam's panning zero-degree axis in relationship to the RLTS grid. (Note that if the webcam is place on a flat, level surface, the horizontal zero degree tilt axis is established.)

To calibrate the grid with respect to the webcam's panning axis, the operator uses the operator controlled manual controls (whether physical buttons on a device or software controls in the webcam control program) to point/aim the webcam at one of the anchors (step 419). When the anchor is aligned in the laptop screen's rendering of the webcam's produced image, the operator OK's this alignment and enters the number or name of the anchor to which the webcam is aligned (step 421). Because the webcam can output the degree of pan and tilt to the RLTS software, the software can now calculate the zero degree axis of the webcam in relationship the webcam location on the RLTS virtual grid (423). The webcam is now calibrated and the process stops (425).

This calibration can be stored in permanent memory in cases where the anchors and webcam are permanently installed in the room. Then turning on the system will access and initialize the calibration.

In an alternative embodiment, where both the anchors and the webcam are permanently installed, the distance from the webcam to the anchors can be entered into the software, and the FIG. 4 calibration is not needed. For this same reason, in this scenario, an RFID chip is not required in the webcam, 121.

The discussion above has detailed how directional control of the webcam in the drawings can be calibrated with respect to the room grid created by the RTLS software for webcam control. In an alternative embodiment this calibration is provided automatically by instructing the software to initiate a calibration routine. For the calibration routine, the webcam scans the entire room (or rather its field of vision), and uses AI to hone in on one of the anchors. This may be accomplished using computer vision and pattern recognition or by finding a light or laser beam, or by identifying a wireless signal or signals in the context of the RTLS software.

Default webcam framing view: The default view is generally the entire in-room audience shown in FIG. 2B. Setting the default view requires aiming, focusing and zooming (that is the framing) the video feed produced by the webcam, 121—which it sends to the laptop, 207, when no one is speaking, that is, when nobody in the audience is using a microphone. See FIG. 3A, 301 for an example of the default view of room 201. The process for setting the default view is detailed in FIG. 5. When the process starts, 501, the operator uses the software or application controls (or buttons on the webcam) to aim, focus, zoom, and frame the image shown on the screen of the laptop (207), so that it captures as much of the audience or width of the room as possible (step 503). The operator then sets this view as the default view for the webcam 121 (step 505) and the process stops (507).

The discussion above has detailed how a default view of the audience is manually set. In an alternative embodiment, this is set automatically. As known to those skilled in the art, AI can recognize human bodies using computer vision and virtual modeling techniques used for augmented and virtual reality. The AI adjusts the framed field of vision of the room so that all bodies are in the frame. This is set as the default view. The default view may change as people leave the room, or as more people enter it and sit down in the rows of seats.

Automatic focus on a speaking audience member: When an individual in a room speaks into one of the microphones with embedded RFID—say participant 211, in room 201, using microphone 101, with embedded chip 111—the present invention will cause the webcam 121 video to be aimed, focused, zoomed and framed as in 303 of FIG. 3B, whereby the head and upper body of participant 211 fills most of the video frame (303). This is accomplished via the process described in flow chart FIG. 6, using data flows shown in FIG. 2A.

Per FIG. 6, the process of focusing starts (601) after a microphone (say, for example, 101 in FIG. 2A and FIG. 2B) is passed to an audience member (211 in FIG. 2B), in step 603. When the audience member turns on the microphone 101 (microphone 101 becomes "active") (step 605), this powers the RFID chip, 111 (step 607), which broadcasts radio frequency transmissions with data stored on the tag, such as its unique number (step 609).

In FIG. 2A, this is shown as the heavy dotted lines emanating from microphone 101 to anchors 141, 143, and 145. The anchors receive the relayed data including received signal strength and time difference of arrival, 611. As known to those skilled in the art, the differences in these values received by the three anchors (141, 143, and 145) enable the location engine, which is part of the RTLS software, to calculate the microphone location in relationship to the anchors using triangulation (613), and plot it on a virtual grid. The RTLS software can then use the information previously gained from calculating the location of the webcam by triangulation, as well as calibrating the panning and tilting axes of the webcam, to calculate how to move the webcam (the angle, tilt and focal length or zoom) to aim at and focus on the microphone (615). Artificial Intelligence (AI) is then used to fine-tune the aim and zoom so that the person holding the microphone (or rather the person's head and upper body, found through AI and virtual reality body segmentation) fills the frame of the video feed (617) as in FIG. 3B. This fine-tuning can be done by physically moving the camera using servomotors remotely controlled by the system, or by digitally processing the untuned video image that the webcam creates. The result is a video feed that looks like 303 of FIG. 3B.

When the audience member is finished speaking and turns the microphone off (619), the RFID chip is powered off (621) and stops sending radio frequency transmissions (623). Because the anchors do not register any tags, the RTLS software cannot find the tag 111 of microphone 101—or any other microphone. Consequently, the webcam returns to its default focus position, sending a video feed of the default camera view (627) and the process stops (629).

Of course, if the microphone 101 is handed to another person, who turns it on, or a different microphone (with embedded RFID tag) is handed to someone who turns that different microphone on, the process starts over, and the webcam focuses on the new speaker.

The discussion above concerning aiming, focusing, and zooming the webcam has often used language most appropriate for a webcam mounted in a cradle, yoke, or articulated arm, in which servomotors physically aim, focus or zoom the webcam. Alternatively, as known to those skilled in the art and particularly as used in systems such as the Owl Labs webcam, the webcam is focused digitally. In a variation of such alternative, the webcam (similar to the Owl Labs webcam or those webcam systems specially approved for Zoom Rooms) provides a video feed of the individual who is speaking, as well as a panorama or default view of the entire audience.

Some webcams, such as the Owl Labs webcam, have a 360° field of vision. In an embodiment of the present invention which utilizes a webcam with 360° field of vision, the webcam automatically focuses on any speaker wherever located in the room or space who uses a microphone with embedded RFID tags. This includes both panelists at the front of the room and audience members who are given one of the microphones to ask a question or comment.

Many laptops have built-in webcams which are aimed and focused so as to most appropriately video a user who is typing at the laptop keyboard. Other webcams can be added as peripherals to laptop computers using the USB interface. Most videoconferencing platforms allow the user to switch which attached webcam is used for the videoconference session, even mid-session. Now consider the scenario of a meeting where the in-person audience does not need to be seen until the end of the presentation, during a question-and-answer period. (Indeed, to make it easier for in-room audiences to see on-screen presentations, or the online participants, the portion of the room with the rows of auditorium-style seating may be darkened until the question-and-answer period.) In such a scenario, during his or her presentation, the speaker, 217, may engage the webcam (not shown) in the laptop, 207, rather than the webcam, 121, which focuses on the in-room audience. This will send video for the speaker to the online participants. When it is time for the in-person audience to make comments or ask questions, the speaker, 217, can then switch the video input for the videoconference platform to webcam 121 and the present invention.

In some scenarios it is desired that online participants always have a view of the in-room audience. In such a situation, a speaker or panelist either uses a microphone without an embedded tag, but which is added to the in-room and online audio mix as known by those skilled in the art, or the software controlling the webcam focusing allows the operator to assign the default view to that microphone.

In this scenario, a separate webcam would be needed to provide a video feed of a speaker or panelist using that microphone—and would require a separate computer providing a separate muted connection to the videoconferencing platform. Note that a videoconferencing platform such as Zoom, which automatically highlights the video feed of the person speaking, would not do so in this situation—where the audio feed of the speaker is sent to Zoom through a different connection (and computer) than the muted video feed of the speaker.

In an alternative embodiment, the in-person component of the hybrid meeting has two webcams, two computers (each with RTLS software), and two sets of wireless microphones with RFID tags. One webcam, computer, and set of microphones provides video and audio of the audience members as described above. The second webcam, computer, and set of microphones provides video and audio of the speakers and panelists at the front of the room. This second webcam is placed either on the panelist table (sometimes called a "head table") facing the speakers/panelists, or at the back of the room. In the latter instance, the webcam can focus on a speaker or panelist even if he or she walks into the audience. Note however, that the audio mix coming from both the panelist set of microphones and the audience set of microphones must be sent to the same mixer (223 of FIG. 2C) which feeds the in-room sound system. As known to those skilled in the art, this may require a mixer with additional input capabilities.

In the discussion above, the RFID chips embedded in the microphones are only turned on when the audio of the microphone is turned on by switching on the microphone. In an alternative embodiment, the circuit for an RFID chip is turned on by voice activation. That is, the microphone is turned on, but the RFID chip will not be turned on until the person holding the microphone starts to speak (or sing, or otherwise direct audio into the microphone). As is known to those skilled in the art, microphones can be designed to be narrowly directional (e.g., cardioid mics) as well as not register sound unless the sound source is in close proximity to the microphone. Directional microphones are often designed so that the user has to speak directly into the microphone for the microphone to register a sound. This helps prevent feedback loops from in-room speakers and amplifiers. In this embodiment, these features allow the voice to trigger the RFID chip, to send the location of the mic (and user's voice) to the system, so that the webcam can focus on the user.

In the discussion above, the RFID chips embedded in the microphones are only turned on when the audio of the microphone is turned on. In an alternate embodiment, these chips are always on, enabled and broadcasting their data over radio frequencies (continuously or at appropriate intervals as designed for this application and known by those skilled in the art)—whether or not the microphone is turned on. However, the RTLS software will then locate all of the chips and microphones. In this case, another method is needed to determine which microphone the webcam must focus on. One way to provide this is by using the separate broadcast frequencies for the different microphones in the microphone set. A circuit is added to the wireless microphone receiver, the USB audio interface, or a separate mixer, which sends the information to the computer concerning which microphone is broadcasting. Because each microphone is identified with a specific RFID tag, the RTLS software then ascertains which chip is associated with the broadcasting microphone, and the location of that chip (and microphone) is used to determine where the webcam needs to be aimed. The rest of the system is the same as previously discussed.

In the discussion above, the RFID chips/tags are described as embedded in the microphones. In an alternative embodiment, the chips and tags are attached or clipped to the microphones. Existing microphone sets can then be retrofitted with the tags produced by a different manufacturer in order to create a self-focusing webcam. One method of effectuating this alternative embodiment is by using a separate device referred to herein as a Microphone Locater Device (MLD), identified in FIG. 7 as 700, and as more fully described below and in FIG. 7, FIG. 8A, FIG. 8B, and FIG. 8C. The basic operation of the MLD is as follows: The MLD receives tag locations from the independent RTLS system of anchors and tags (742 of FIG. 7). The MLD receives separate input from the independent wireless microphone system (740 of FIG. 7), more specifically separate originating audio input from each wireless microphone (101, 103, 105, and 107 of FIG. 7) and delivered to the MLD through the wireless microphone system (740). These are identifiable by their use of separate broadcast frequencies. Tag locations are stored in the MLD (700) cache memory (721, 723, 725, and 727). In the MLD, the tags (and their locations) are associated with the separate mics (based upon used broadcast frequency) using methods such as described below. The Microphone Locater Device (MLD) then outputs the location of the microphone which is transmitting actual audio (user input)—and sends that location (731*a*, 731*b*, 731*c*, or 731*d*) to the webcam (or the computer that controls the webcam). A more complete disclosure follows.

Figure 7:
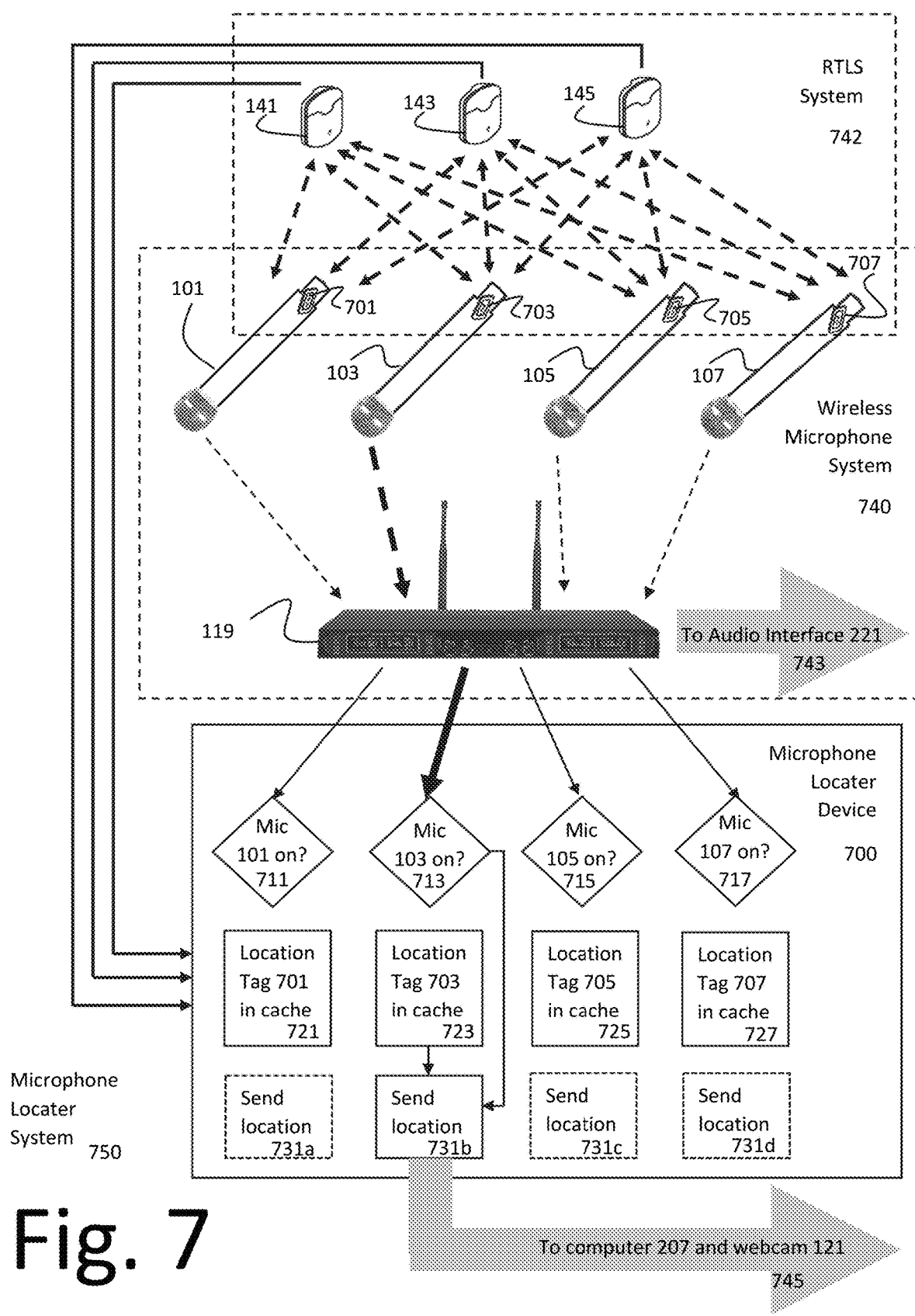
FIG. 7 is a component view of an alternative embodiment of the present invention, along with data flows among the components.

Consider now FIG. 7 in more detail. This shows the components of the Microphone Locater System (750), and the dataflows between them, but unlike FIG. 2A and FIG. 2B does not show the actual location of the components within the physical room in which the participants are using the microphones.

The components of the Microphone Locater System (750 in FIG. 7) include an independent wireless microphone system 740 with microphones 101, 103, 105, and 107, and a receiver 119. These are the same or similar to the microphones and receiver shown in FIG. 1A, FIG. 2A, FIG. 2B, FIG. 2C, FIG. 3A, and FIG. 3B.

(As discussed more fully below, the tags shown in FIGS. 7 (701, 703, 705, and 707) are not embedded in, or built into, the microphones (101, 103, 105, and 107), but rather are attached to the microphones, and operate independently of the microphone circuitry.)

The data flows between the microphones (101, 103, 105, and 107) and the receiver 119 are shown in FIG. 7. For exemplary purposes, at the moment of operation being illustrated, only microphone 103 is transmitting audio to the receiver 119, which is shown by a heavy dashed line. Likewise, only the audio output for microphone 103, received at the receiver 119 and then sent from the receiver to the MLD, 700, is non-null (see heavy arrow from 119 to 713).

The receiver 119 of such a wireless microphone system 740 typically provides separate audio output for each microphone (101, 103, 105, and 107) which can be sent to an audio mixer via cables. (The cables from the receiver 119 to the MLD 700 are not shown, but are represented in FIG. 7 by the four arrows from the receiver to the MLD.) These multiple audio outputs are provided so that the typical microphone system can be used not just in a presentation setting (where only one person at a time is expected to speak) but also by a musical group with a number of different musicians (e.g., singers and instrumentalists) each singing or playing into a separate microphone, thereby producing audio and music at the same time, which distinct audio inputs can be adjusted by a separate audio mixer. These audio cables will be connected to the Microphone Location Device 700, as discussed in more detail below.

As with FIG. 2C, the audio output of the receiver 119 is also sent to the Audio Interface 221, after which it will be send to a computing system 207 for transmission to a videoconferencing platform 234 such as Zoom, via the internet 233. The audio output will also be sent via mixer, 223, and amplifier(s) 225 to an audio speaker or in-room sound system 231. This is indicated more schematically in FIG. 7 by the large grey arrow labeled 743 from the receiver pointing to the right, and labeled as indicating data flow to the Audio Interface 221.

The Microphone Locater System 750 also includes a separate independent RTLS system 742 with RFID tags (701, 703, 705, and 707) and anchors (141, 143, and 145). The anchors in FIG. 7 are similar to those shown in FIG. 1C, FIG. 2A, and FIG. 2B, and thus are numbered the same. The anchors shown in FIG. 7 are distributed about the room where the microphones are used in the same manner as the anchors in FIG. 2A and FIG. 2B, so that the anchors can accurately perform triangulation of the RFID tags. The RFID tags in FIG. 7 are both similar to and different from those shown in FIG. 2A and FIG. 2B. They are similar, because they use the same frequencies and have the same range. They may be active and battery powered, or passive and battery assisted. However, the tags in FIG. 7 are different in that they are not connected to the batteries operating the wireless mics (101, 103, 105, and 107) and are not connected to the on-off circuitry of those mics. Instead, the tags in FIG. 7 are always "on" (but not necessarily continually transmitting)—the same as RFID tags in other independent RTLS systems. For this reason, the tags in FIG. 7 are numbered differently than the tags in FIG. 1A. Most importantly, and as mentioned above, the tags (701, 703, 705, and 707) shown in FIG. 7 are not embedded in microphones 101, 103, 105, and 107, but rather attached or affixed to them. This is accomplished via glue, double-sided tape, mounting clips, or tie-downs in one of the many ways known to those skilled in the art.

As previously discussed, the anchors are connected (either via cable or wirelessly) to a processor or computing device that is running RTLS hardware and software, which has the capability of processing the different signals transmitted by the tags to the anchors, so that the RTLS system can use triangulation to determine the location of the tags in the room. The processor may be located in an anchor, in the webcam (not shown), in the Microphone Locater device (700), in a separate computer such as 207, or in a standalone RTLS appliance (not shown).

The webcam used for the hybrid meeting is not shown, but is the same or similar to that shown in FIG. 1B as 121. The webcam likewise has an RFID tag 123 either embedded in it or attached to the webcam. In setting up the RTLS system used in FIG. 7, the location and orientation of the webcam with respect to the anchors is calculated and calibrated as previously described in FIG. 4. The webcam default view is likewise set up per FIG. 5.

As before, the RTLS system (742) uses triangulation of the radio transmissions received by the anchors (141, 143, and 145) to calculate the relationship of the location of the tags (701, 703, 707, and 709) attached to the microphones (101, 103, 105, and 107) to the location of the webcam 121 (or rather its tag 123). The RTLS system then sends that locational information to the Microphone Location Device 700.

Consider now the Microphone Locater Device (700) which ties the Microphone Locater System 750 together and integrates information from the independent wireless microphone system (740) with the tag locations determined by the independent RTLS system (742).

The Microphone Locater Device (700) includes electronic circuitry and special processors (both not shown), along with both long-term and short-term memory, such as, but not limited to, memory cache to store tag location (721, 723, 725, and 727). The processors and circuitry include digital and/or analogue circuits (not shown).

Each RFID tag is associated with a specific audio cable input during the system set up as described in flow chart FIG. 8A. After the start of the process, 803, a tag is attached to each of the microphones, 803, in the wireless microphone system. The serial number (or internal RTLS identifier number) for the tag is entered in the MLD, 805. This may be by keyboard, dial, or automated detector (such as the IR detectors used to pair wireless mics with receivers). These various methods of entering tag identifiers are known to those skilled in the art. The tag identifier is stored in the memory of the device 700. In a preferred embodiment, this is non-volatile memory, so that once the device is set up, the device remembers the tags' identifiers when the system is turned off, and then the device remembers the identifiers when turned on again for subsequent use during hybrid meetings. Then each tag identifier is similarly associated with one of the microphone inputs, 807. This too is stored in non-volatile memory, and the process stops, 809. The MLD has input ports similar to a mixer. Each port takes one individual microphone output of the receiver. (Remember that each microphone broadcasts on a different frequency, so that the receiver can produce these individual outputs, even if all microphones are being used at once by a musical group.)

Just as wireless microphone systems are produced for different microphone configurations (such as 2 mics, 4 mics, 8 mics, etc.), often with a separate wireless radio channel for each mic and a separate audio output for each wireless radio channel, the Microphone Location Device is produced in similarly different configurations, with inputs for 2 mics, 4 mics, 8 mics, etc.

The RTLS system 742 sends location data of the tags to the MLD 700. This location data for each tag is stored in a separate cache assigned to that tag (via the tag identifier entered into the MLD in step 807 of FIG. 8A). In the example shown in FIG. 7, the location of tag 701 is stored in cache 721; the location of tag 703 is stored in cache 733; the location of tag 705 is stored in cache 735; and the location of tag 707 is stored in cache 735.

Each audio output cable for a specific mic coming out of the receiver is plugged into the MLD input chosen for that associated mic/tag combination in step 807 of FIG. 8A.

In a permanently installed or rack-mounted system, this connection is done only once. For a portable system, designed to assist hybrid meetings in different rooms or different locations, the installer must take care to correctly match the cables from the receiver mic outputs to the MLD inputs. (As with other audio equipment, using color-coded cables or affixing labels to the cables, outputs, and inputs, will assist with this task.) Otherwise, the installer, runs through the set-up process (FIG. 8A) again.

For purposes of illustration in FIG. 7, when a decision point or component is labeled as "Mic xyz is on?" (see 711, 713, 715, and 717), a more correct description is a query that the mic is broadcasting audio to the receiver. However, there is not enough room in the diagram for all of those words, though that is the intent of the label.

When the Microphone Locater Device 700 detects that a mic is broadcasting audio, say via mic 103 at 713, the location of the associated tag 703 will be retrieved from its cache 723, and the location will be sent as output 731b from the MLD 700. The location is then transmitted to the computer 207 and webcam 121, as indicated by the large grey arrow 745. The process by which the MLD 700 does this will be described in greater detail below.

First, consider that flow chart shown in FIG. 8C, which corresponds to (and describes the processes within) the schematic data flows pictured in FIG. 7, and shows how the processes of three independent systems (shown in both figures) interact. The three independent systems are the wireless microphone system (841 in FIG. 8C and 740 in FIG. 7), the RTLS system (851 in FIG. 8C and 742 in FIG. 7), and the Microphone Locater Device (860 in FIG. 8C and 700 in FIG. 7). FIG. 7 and FIG. 8C also show the output from these independent systems to the other components of the videoconferencing system (e.g., the output to the computing, audio, video, and networking equipment more fully shown in FIG. 2C).

The process in FIG. 8C starts (831) with a user or operator turning on the microphone locater system (833). In actuality, the user/operator would also have to turn on the rest of the videoconferencing system for meaningful interaction—that is, the rest of the equipment shown in exemplary fashion in FIG. 2C has to be turned on as well. This includes, but is not limited to, the webcam, 121, the computing device, 207 the large screen monitor or projector, 209, the various local audio equipment (such as audio interface, 221, audio mixer(s), 223, amplifier(s) 225, audio speaker or sound system, 231), the internet access point, 233, and the videoconferencing application installed on the computing device, 234.

If the equipment is permanently installed in the building, this might be accomplished by turning on one switch. But in other cases, the operator must separately turn on a number of distinct pieces of audio, video, and computing equipment and software.

After turning on the system, 833, the process flows through node 835, and two of the systems (the wireless microphone system, 841, and the RTLS system, 851) begin gathering audio and locational data.

Within the RTLS system, 851 (also shown as 742 in FIG. 7), the anchors (141, 143, and 145) wirelessly transmit and receive data from the RFID tags (701, 703, 705, and 707) as shown in step 853 (with data flows among the tags and anchors shown in FIG. 7). Then the RTLS system software calculates the locations of the tags (step 855) and sends the location of each tag to the Microphone Locater Device (shown as 700 in FIG. 7 and 863 in FIG. 8C) in step 857, where the location of each tag is stored in cache (shown in FIG. 7 as 721, 723, 725, and 727) in step 861.

At the same time, in parallel, the wireless microphone system 841 gathers audio when a mic (101, 103, 105 or 107) picks up sound, 843. The mic transmits the audio to the receiver, 119, in step 845, which the receiver receives, 847. The receiver sends the audio signal to the Microphone Locater Device (700 in FIG. 7 and 860 in FIG. 8C) in step 849. At the same time the audio signal is sent to the videoconferencing platform as well as the in-room speaker or sound system, shown in 743 (shown in both FIG. 7 and FIG. 8C). These components are illustrated in more detail in FIG. 2C. After step 827, the process arrives at node D, 863.

Figure 3A:
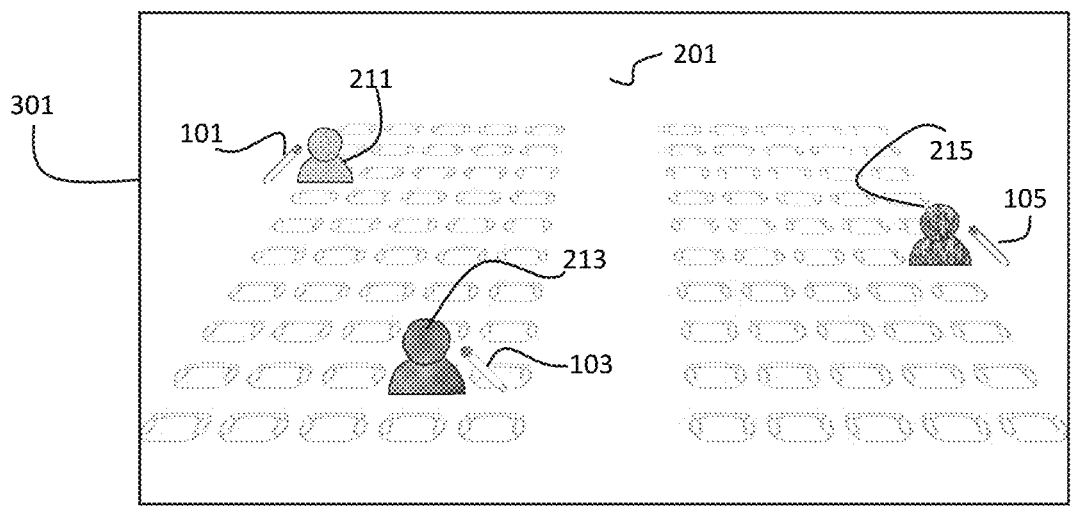
FIG. 3A is a screen shot from a video taken by the webcam of the audience shown in the perspective view of the room per FIG. 2B, when no member of the audience is speaking into a microphone—otherwise set as the "default view".
Figure 3B:
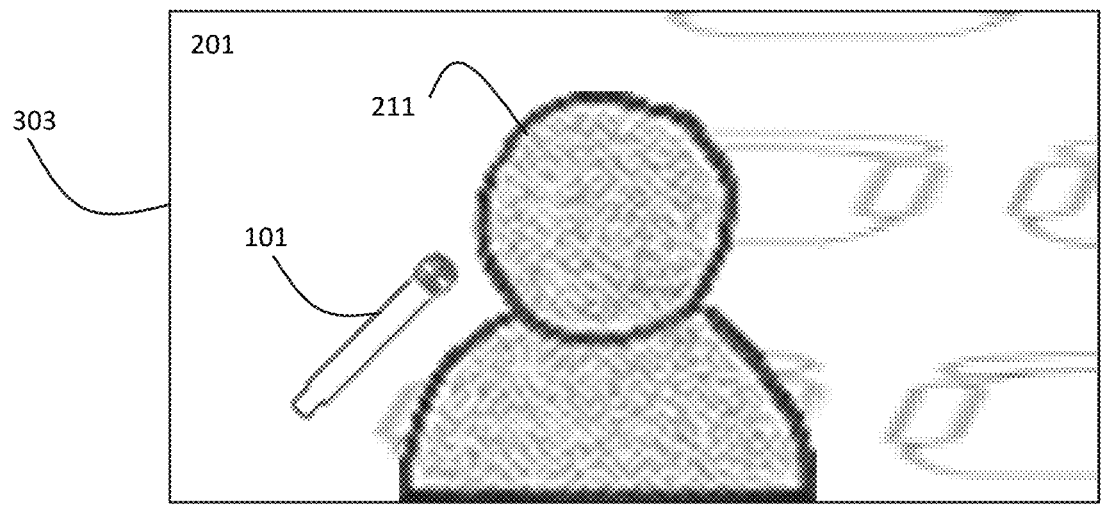
FIG. 3B is a screen shot from the video taken when an audience member speaks into one of the microphones shown in FIG. 1A, and the system zooms in on the person/speaker holding a microphone.

The Microphone Locater Device, 860 in FIG. 8C, processes the information received from node D, 863, through to node E, 865. It uses the audio information from the microphone signal to determine which tag location information to extract from cache, as detailed in FIG. 8B, and described below. Then in step 745 (as shown in both FIG. 7 and FIG. 8C) the MLD sends the location of the active microphone to the rest of the system, that is, to the computer and webcam, so that the webcam focuses and frames the video of the person speaking into the active microphone. (In FIG. 7 the active microphone is 103.) If no microphone is active, the Microphone Locater Device, 860, instructs the webcam to provide the default view (an example of which is shown in FIG. 3A).

After node E, 865, if the system is still turned on (871), the process returns to node A, 835, for the wireless microphone system, 841, and the RTLS system, 851, to gather more audio and locational data. If at decision node, 871, the system is no longer turned on, the process stops, 873.

Consider now FIG. 8B which shows detail of the processing within the MLD (860 in FIG. 8C and 700 in FIG. 7). FIG. 8B is to be combined with the processes shown in FIG. 8C. After node D, 863 in FIG. 8C, that process continues at node B, 811 in FIG. 8B. The process then, in step 803, counts the number of microphone inputs (N) obtained from the receiver 119 and connected to the MLD (700/860). It does this utilizing sensors incorporated into the MLD cable input jacks (not shown, but known to those skilled in the art). The MLD circuitry and software then runs a software "do" loop to determine which microphone is active. As shown in FIG. 8B, the mic input counter (MIC) variable is set to 1, step 815. An audio load sensor (or gateway) then determines if the mic input is sending audio, step 817. If so, the MLD program retrieves the location of the tag associated with the mic input, step 819, from where it was stored (e.g., 723 in FIG. 7 and 861 in FIG. 8C)—and then sends that tag location (e.g., 731b in FIG. 7) to the computer and webcam for automatic focusing, step 821 (745 in FIG. 7 and FIG. 8C).

The process then proceeds through node C, 823, of FIG. 8B, to node E, 865 of FIG. 8C, completing this cycle of MLD processing.

Note that FIG. 7 and FIG. 8B have different illustrations of the process. Step 817 in FIG. 8B includes the queries 711, 713, 715, and 717 shown in FIG. 7. In contrast, FIG. 7 shows all of the queries at once to indicate that the query is made of each input. FIG. 8 shows the queries being made one at a time via a "do" loop. Somewhat similarly, step 821 in FIG. 8B includes potential actions 731a, 731b, 731c, and 731d in FIG. 7, however, only one of those potential actions (sending the location of the tag respectively numbered 721, 723, 725, or 727) is taken by the device (see steps 821 and 829 in FIG. 8B), depending upon which microphone (if any) is active.

Returning to step 817, if the mic input being checked is not sending audio, the process queries whether all mic inputs have been checked (that is, if MIC=N), step 825. If so, this means that even though all of the mics may be turned on (and "live") no one is talking into any one of them. No mic is active. Consequently, the MLD sends a null location indicator to the computer and webcam, effectively instructing the webcam to focus per the default view previously established, step 829 (data flow 745 in FIG. 7 and FIG. 8C). An example of a default view is shown in FIG. 3A.

The process then proceeds through node C, 823, of FIG. 8B, to node E, 865 of FIG. 8C, completing this cycle of MLD processing.

Returning to step 825, if MIC≠N (the mic input counter variable does not equal N the number of inputs), then the program increments the microphone input counter by 1, 827 and returns to step 817 to ask again whether this other mic input is sending an audio signal.

In this way the MLD is continually checking which microphone (if any) is sending an audio signal and (a) sending the tag location of the active microphone (if any) to the webcam for focusing and framing, or (b) sending a null or default signal to engage the default webcam view when no microphone is sending an audio signal.

To prevent momentary pauses in audio transmission from a microphone from triggering a signal to show the default view, an alternate embodiment incorporates a timer before signaling the default view.

In an alternative embodiment, the Microphone Locater Device is built into the receiver. In an alternative embodiment, as mentioned above, the RFID tag is embedded in the microphone housing, but not connected to the microphone circuitry, battery, or power switch, and microphone location is determined by an MLD integrated into the receiver.

In an alternate embodiment, the microphones are wired (rather than wireless) but portable, their audio signals are sent over cables and wires to the sound system for processing (rather than wirelessly), and their signals are first processed by a mixer or audio interface (rather than a wireless receiver). In deploying this embodiment, some of the wired mics are placed on microphone stands at various places in the in-room facility. These include floor stands in the aisles of an auditorium, or short stands placed in front of panelists at a table on stage in the front of the auditorium. In an alternate embodiment, some of the in-room microphones are wired, and some are wireless.

For ease of illustration and discussion, the figures above show four microphones. However, as known to those skilled in the art, a wireless microphone system can have more or fewer microphones, and as known by those so skilled, the disclosure above and related figures can be readily modified to accommodate wireless microphone systems with more or fewer microphones.

In the discussion above, the anchors are described as standalone devices, and details of the speakers and sound system are not provided. In an alternate embodiment, the anchors are built into portable speakers which are then placed around the room as appropriate.

The RTLS software is discussed as loaded onto the laptop computer, 207. In an alternate embodiment, the RTLS software is embedded in a processor built into the webcam. In an alternate embodiment, both the RTLS software and the software for aiming, focusing, and zooming the webcam and framing its video are built into a separate device.

The present invention can also be included in an article of manufacture (e.g., one or more tangible computer program products) having, for instance, non-transitory computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s)/processor(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

Such computers/processors may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in non-transitory computer-readable media in any suitable form. For simplicity of illustration, data structures may be shown to have fields that are related through location in the data structure. Such relationships may likewise be achieved by assigning storage for the fields with locations in a non-transitory computer-readable medium that conveys relationship between the fields. However, any suitable mechanism may be used to establish a relationship between information in fields of a data structure, including through the use of pointers, tags or other mechanisms that establish relationship between data elements.

The scope of the present invention thus further includes a tangible computer program product for performing auto-focusing of a camera on an in-person attendee in a hybrid meeting who is speaking into a wireless microphone, wherein the computer program product comprises non-transitory computer-readable media encoded with instructions for execution by a processor (including the processor that the RTLS software is embedded into) to perform the methods described above.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It should be appreciated by those skilled in the art that various modifications and variations may be made to the present invention without departing from the scope and spirit of the invention. It is intended that the present invention include such modifications and variations as come within the scope of the present invention.

What is claimed is:

1. A computer program product for auto-focusing a camera on an in-person attendee in a hybrid meeting who is speaking into a microphone at a live location of the hybrid meeting, wherein the hybrid meeting is being streamed via a videoconferencing system to one or more remote attendees, the live location including a real-time location system (RTLS) having a RTLS tag and a plurality of RTLS anchors for locating a position of the RTLS tag in three-dimensional space, wherein the RTLS tag is fixed to the microphone and transmits a signal that is received by the plurality of RTLS anchors, the computer program product comprising a computer readable medium tangibly embodying non-transitory computer-executable program instructions thereon that, when executed, cause one or more computing devices to:
   (a) detect when the microphone is active;
   (b) identify, using the RTLS, the position of the RTLS tag in three-dimensional space in the live location by using the signal transmitted from the RTLG tag and received by the RTLS anchors to calculate the position of the RTLS tag in three-dimensional space,
       wherein the position of the RTLS tag in three-dimensional space in the live location is presumed to be the same position as the microphone that the RTLS tag is fixed to;
   (c) auto-focus the camera on the identified live location when the microphone is active, the camera thereby outputting a video signal of an area in the proximity of the microphone which is presumed to include an image of the in-person attendee who is speaking into the microphone; and (d) transmit the live location camera image and the audio signal to the videoconferencing system for streaming to the one or more remote attendees.

2. The computer program product of claim 1 wherein the live location includes a video monitor and audio system connected to the videoconferencing system, thereby allowing the in-person attendees to view the same live location camera image and hear the same audio signal that the remote attendees view and hear via the videoconferencing system.

3. The computer program product of claim 1 wherein the RTLS tag is an RFID tag and the RTLS anchors detect RFID signals.

4. The computer program product of claim 1 wherein the microphone becomes active when it is powered on.

5. The computer program product of claim 1 wherein the microphone becomes active by voice-activation.

6. The computer program product of claim 1 wherein the camera auto-focusing further uses face and body detection in the area that is in the proximity of the microphone to more accurately ensure that an image of the in-person attendee who is speaking into the microphone is included in the video signal.

7. The computer program product of claim 1 wherein the microphone is a wireless microphone.

8. An automated method for auto-focusing a camera on an in-person attendee in a hybrid meeting who is speaking into a microphone at a live location of the hybrid meeting, wherein the hybrid meeting is being streamed via a videoconferencing system to one or more remote attendees, the live location including a real-time location system (RTLS) having a RTLS tag and a plurality of RTLS anchors for locating a position of the RTLS tag in three-dimensional space, wherein the RTLS tag is fixed to the microphone and transmits a signal that is received by the plurality of RTLS anchors, the method comprising:

(a) detecting when the microphone is active;
(b) identifying, using the RTLS, the position of the RTLS tag in three-dimensional space in the live location by using the signal transmitted from the RTLG tag and received by the RTLS anchors to calculate the position of the RTLS tag in three-dimensional space,
wherein the position of the RTLS tag in three-dimensional space in the live location is presumed to be the same position as the microphone that the RTLS tag is fixed to;
(c) auto-focusing the camera on the identified live location when the microphone is active, the camera thereby outputting a video signal of an area in the proximity of the microphone which is presumed to include an image of the in-person attendee who is speaking into the microphone; and
(d) transmitting the live location camera image and the audio signal to the videoconferencing system for streaming to the one or more remote attendees.

9. The automated method of claim 8 wherein the live location includes a video monitor and audio system connected to the videoconferencing system, thereby allowing the in-person attendees to view the same live location camera image and hear the same audio signal that the remote attendees view and hear via the videoconferencing system.

10. The automated method of claim 8 wherein the RTLS tag is an RFID tag and the RTLS anchors detect RFID signals.

11. The automated method of claim 8 wherein the microphone becomes active when it is powered on.

12. The automated method of claim 8 wherein the microphone becomes active by voice-activation.

13. The automated method of claim 8 wherein the camera auto-focusing further uses face and body detection in the area that is in the proximity of the microphone to more accurately ensure that an image of the in-person attendee who is speaking into the microphone is included in the video signal.

14. The automated method of claim 8 wherein the microphone is a wireless microphone.

\* \* \* \* \*

UNITED STATES PATENT AND TRADEMARK OFFICE
CERTIFICATE OF CORRECTION

PATENT NO. : 11,601,731 B1
APPLICATION NO. : 17/952802
DATED : March 7, 2023
INVENTOR(S) : Benjamin Slotznick It is certified that error appears in the above-identified patent and that said Letters Patent is hereby corrected as shown below:

In the Claims

Column 24, Line 55: change "RTLG" to --RTLS--

Column 26, Line 1: change "RTLG" to --RTLS--

Signed and Sealed this
Twenty-seventh Day of June, 2023

Katherine Kelly Vidal
*Director of the United States Patent and Trademark Office*